(12) United States Patent
Omura et al.

(10) Patent No.: US 9,909,198 B2
(45) Date of Patent: Mar. 6, 2018

(54) METHOD FOR PRODUCING A LOW ALLOY STEEL FOR OIL COUNTRY TUBULAR GOODS HAVING EXCELLENT SULFIDE STRESS CRACKING RESISTANCE

(71) Applicant: NIPPON STEEL & SUMITOMO METAL CORPORATION, Tokyo (JP)

(72) Inventors: Tomohiko Omura, Kishiwada (JP); Yuji Arai, Amagasaki (JP); Kaori Kawano, Neyagawa (JP); Akihiro Sakamoto, Kisarazu (JP); Kazuo Okamura, Nishinomiya (JP); Kenji Yamamoto, Hyogo (JP); Keiichi Kondo, Wakayama (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 352 days.

(21) Appl. No.: 14/431,394

(22) PCT Filed: Nov. 5, 2012

(86) PCT No.: PCT/JP2012/078657
§ 371 (c)(1),
(2) Date: Mar. 26, 2015

(87) PCT Pub. No.: WO2014/068794
PCT Pub. Date: May 8, 2014

(65) Prior Publication Data
US 2015/0247226 A1 Sep. 3, 2015

(51) Int. Cl.
*C21D 1/22* (2006.01)
*C21D 9/06* (2006.01)
(Continued)

(52) U.S. Cl.
CPC .............. *C22C 38/32* (2013.01); *C21D 1/18* (2013.01); *C21D 6/002* (2013.01); *C21D 6/005* (2013.01); *C21D 6/008* (2013.01); *C21D 8/005* (2013.01); *C21D 8/10* (2013.01); *C21D 8/105* (2013.01); *C21D 9/08* (2013.01); *C21D 9/085* (2013.01);
(Continued)

(58) Field of Classification Search
None
See application file for complete search history.

(56) References Cited

U.S. PATENT DOCUMENTS

| | | | | |
|---|---|---|---|---|
| 2,875,109 | A * | 2/1959 | Carter | C21D 1/78 148/540 |
| 2006/0016520 | A1* | 1/2006 | Numata | C22C 38/02 148/335 |

FOREIGN PATENT DOCUMENTS

| | | |
|---|---|---|
| CA | 2574025 | 1/2006 |
| CA | 2695688 | 3/2009 |

(Continued)

*Primary Examiner* — Deborah Yee
(74) *Attorney, Agent, or Firm* — Clark & Brody

(57) ABSTRACT

The low alloy steel for oil country tubular goods according to the present invention has a chemical composition containing, by mass percent, C: 0.56 to 1.00%, Si: 0.05 to 0.50%, Mn: 0.05 to 1.00%, P: at most 0.025%, S: at most 0.010%, Al: 0.005 to 0.100%, Mo: 0.40 to 1.00%, V: 0.05 to 0.30%, and O: at most 0.010%, the balance being Fe and impurities, wherein the yield stress thereof is at least 862 MPa, and the half-value width of a [211] crystal surface obtained by X-ray diffraction is at most 0.50°.

8 Claims, 4 Drawing Sheets

(51) Int. Cl.
    *C21D 9/14*    (2006.01)
    *C21D 8/10*    (2006.01)
    *C22C 38/32*   (2006.01)
    *C21D 9/08*    (2006.01)
    *C22C 38/12*   (2006.01)
    *C22C 38/00*   (2006.01)
    *C22C 38/02*   (2006.01)
    *C22C 38/04*   (2006.01)
    *C22C 38/06*   (2006.01)
    *C22C 38/14*   (2006.01)
    *C22C 38/22*   (2006.01)
    *C22C 38/24*   (2006.01)
    *C22C 38/26*   (2006.01)
    *C22C 38/28*   (2006.01)
    *C21D 1/18*    (2006.01)
    *C21D 6/00*    (2006.01)
    *C21D 8/00*    (2006.01)
    *F16L 9/02*    (2006.01)

(52) U.S. Cl.
    CPC .......... *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/24* (2013.01); *C22C 38/26* (2013.01); *C22C 38/28* (2013.01); *F16L 9/02* (2013.01); *C21D 2211/008* (2013.01)

(56) References Cited

FOREIGN PATENT DOCUMENTS

| | | |
|---|---|---|
| CN | 101418421 | 4/2009 |
| JP | 06-322478 | 11/1994 |
| JP | 08-311551 | 11/1996 |
| JP | 11-335731 | 12/1999 |
| JP | 2000-119798 | 4/2000 |
| JP | 2000-178682 | 6/2000 |
| JP | 2000-256783 | 9/2000 |
| JP | 2000-297344 | 10/2000 |
| JP | 2005-350754 | 12/2005 |
| JP | 2006-265657 | 10/2006 |
| JP | 2008-057007 | 3/2008 |
| WO | 2012/127811 | 9/2012 |

* cited by examiner

METHOD FOR PRODUCING A LOW ALLOY STEEL FOR OIL COUNTRY TUBULAR GOODS HAVING EXCELLENT SULFIDE STRESS CRACKING RESISTANCE

TECHNICAL FIELD

The present invention relates to a steel for oil country tubular goods and a manufacturing method therefor and, in particular, to a low alloy steel for oil country tubular goods, which is used for oil country tubular goods of the casing, tubing, and the like for oil wells and gas wells, and a manufacturing method for the same.

BACKGROUND ART

With increasing depth of an oil well and a gas well (hereinafter, an oil well and a gas well are referred simply to as an "oil well" as a general term), the oil country tubular goods are required to have a higher strength. Conventionally, oil country tubular goods of 80 ksi grade (having a yield stress of 80 to 95 ksi, that is, 551 to 654 MPa) or 95 ksi grade (having a yield stress of 95 to 110 ksi, that is, 654 to 758 MPa) have been used widely. Nowadays, however, oil country tubular goods of 110 ksi grade (having a yield stress of 110 to 125 ksi, that is, 758 to 862 MPa) are put in use.

Further, many of the deep wells having been developed recently contain corrosive hydrogen sulfide. Therefore, the oil country tubular goods are required to have not only a high strength but also a sulfide stress cracking resistance (hereinafter, also referred to as an SSC resistance).

As a measure for improving the SSC resistance of the conventional oil country tubular goods of 95 to 110 ksi grades, there has been known a method in which a steel is purified, or a steel micro-structure is made fine. For example, JP62-253720A proposes a method for improving the SSC resistance by reducing impurity elements such as Mn and P. JP59-232220A proposes a method in which grains are made fine by performing quenching treatment twice to improve the SSC resistance.

As described above, to meet the requirement for higher strength of oil country tubular goods, nowadays, a steel for oil country tubular goods of 125 ksi grade (having a yield stress of 862 to 965 MPa) are proposed. However, with an increase in strength, the sulfide stress cracking (SSC) is liable to occur. Therefore, for the steel for oil country tubular goods of 125 ksi grade or higher, further improvement is required for the SSC resistance as compared with the conventional steel for oil country tubular goods of 95 ksi or 110 ksi grade.

JP6-322478A, JP8-311551A, JP11-335731A, JP2000-178682A, JP2000-256783A, JP2000-297344A, JP2000-119798A, JP2005-350754A, and JP2006-265657A propose measures for improving the SSC resistance of high-strength steels for oil country tubular goods.

JP6-322478A proposes a method in which a steel microstructure is made fine by induction heating heat treatment to improve the SSC resistance of a steel material of 125 ksi grade. JP11-335731A proposes a method in which the hardenability is enhanced when using the direct quenching process and the tempering temperature is increased to improve the SSC resistance of steel pipes of 110 ksi grade to 140 ksi grade. JP11-335731A proposes a method for improving the SSC resistance of a low alloy steel of 110 ksi grade to 140 ksi grade by regulating the alloy elements so as to have optimal contents. JP2000-178682A, JP2000-256783A and JP2000-297344A propose methods for improving the SSC resistances of low alloy steels for oil country tubular goods of 110 ksi grade to 140 ksi grade by controlling the mode of carbide. JP2000-119798A proposes a method for delaying the time of occurrence of SSC in a steel material of 110 ksi grade to 125 ksi grade by precipitating fine V carbides in large amounts. JP2005-350754A proposes a method for improving the SSC resistance of oil country tubular goods of 125 ksi grade or higher by controlling the dislocation density and the hydrogen diffusion coefficient to desired values. JP2006-265657A proposes a method in which a bainite single phase structure containing much carbon is formed by stopping water cooling at 400 to 600° C. at the water cooling time and by performing the isothermal transformation heat treatment (austemper treatment) at 400 to 600° C. to improve the SSC resistance of a steel for oil country tubular goods of 125 ksi grade or higher.

SUMMARY OF INVENTION

Nowadays, further improvement is required for the SSC resistance of a steel for oil country tubular goods of 125 ksi grade or higher (having a yield stress of 862 MPa or higher).

An objective of the present invention is to provide a low alloy steel for oil country tubular goods that has a yield stress of 862 MPa (125 ksi) or higher and an excellent SSC resistance.

The low alloy steel for oil country tubular goods according to the present invention has a chemical composition containing, by mass percent, C: 0.56 to 1.00%, Si: 0.05 to 0.50%, Mn: 0.05 to 1.00%, P: at most 0.025%, S: at most 0.010%, Al: 0.005 to 0.100%, Mo: 0.40 to 1.00%, V: 0.07 to 0.30%, O: at most 0.010%, and N: at most 0.0300%, the balance being Fe and impurities, wherein the yield stress thereof is at least 862 MPa, and the half-value width of a [211] crystal surface obtained by X-ray diffraction is at most 0.50°.

The low alloy steel for oil country tubular goods according to the present invention has a yield stress of at least 862 MPa and an excellent SSC resistance.

The low alloy steel for oil country tubular goods according to the present invention may contain Cr: at most 2.00% in place of some of Fe. Also, the low alloy steel for oil country tubular goods according to the present invention may contain, in place of some of Fe, one or more kinds selected from a group consisting of Nb: at most 0.100%, Ti: at most 0.100%, and Zr: at most 0.100%. The low alloy steel for oil country tubular goods according to the present invention may contain Ca: 0.0100% or less in place of some of Fe. The low alloy steel for oil country tubular goods according to the present invention may contain B: at most 0.0030% in place of some of Fe. Preferably, the low alloy steel for oil country tubular goods according to the present invention further has a retained austenite percentage of lower than 5%.

The first manufacturing method for a low alloy steel for oil country tubular goods according to the present invention includes the steps of hot working a steel material having a chemical composition containing, by mass percent, C: 0.56 to 1.00%, Si: 0.05 to 0.50%, Mn: 0.05 to 1.00%, P: at most 0.025%, S: at most 0.010%, Al: 0.005 to 0.100%, Mo: 0.40 to 1.00%, V: 0.07 to 0.30%, O: at most 0.010%, and N: at most 0.0300%, the balance being Fe and impurities; quenching the steel material by continuous cooling treatment at a cooling rate such that the time period during which the material temperature decreases from the quenching temperature to the martensite transformation start temperature is within 600 seconds; and tempering the steel material having been quenched.

The first manufacturing method according to the present invention allows a low alloy steel for oil country tubular goods having an excellent SSC resistance to be produced.

The second manufacturing method for a low alloy steel for oil country tubular goods according to the present invention includes the steps of hot working a steel material having a chemical composition containing, by mass percent, C: 0.56 to 1.00%, Si: 0.05 to 0.50%, Mn: 0.05 to 1.00%, P: at most 0.025%, S: at most 0.010%, Al: 0.005 to 0.100%, Mo: 0.40 to 1.00%, V: 0.07 to 0.30%, O: at most 0.010%, and N: at most 0.0300%, the balance being Fe and impurities; subjecting the steel material to quenching treatment including isothermal treatment; and tempering the steel material having been quenched. The step of subjecting the steel material to quenching treatment including isothermal treatment includes an initial cooling step of cooling the steel material from the quenching temperature to a temperature exceeding 100° C. and not higher than 300° C. at a cooling rate of at least 0.7° C./s; an isothermal treatment step of holding the steel material having been subjected to the initial cooling step in the temperature range of exceeding 100° C. and not higher than 300° C.; and a final cooling step of cooling the steel material having been subjected to the isothermal treatment step.

The second manufacturing method according to the present invention allows a low alloy steel for oil country tubular goods having an excellent SSC resistance to be produced.

DESCRIPTION OF EMBODIMENTS

An embodiment of the present invention will now be described in detail with reference to the accompanying drawings. An ideogram of "%" relating to the elements of chemical composition means "mass percent".

[Outline of Low Alloy Steel for Oil Country Tubular Goods of this Embodiment]

The present inventors thought that the SSC resistance of a low alloy steel for oil country tubular goods is affected by the shapes of carbides and the dislocation densities in the steel. As the result of investigation and study, the present inventors obtained the following findings.

(1) The low alloy steel for oil country tubular goods is usually subjected to a quench and temper treatment. At the time of a quench and temper treatment, various carbides are produced in the steel. With increasing flatness of the shapes of $M_3C$ carbide and $M_{23}C_6$ carbide, which are produced at the crystal grain boundaries, among these carbides, sulfide stress cracking (SCC) is liable to occur with these carbides being start points. In this embodiment, "M" of the $M_3C$ carbide and $M_{23}C_6$ carbide is Fe, Cr or Mo. Hereunder, the $M_3C$ carbide and $M_{23}C_6$ carbide produced at the crystal grain boundaries are defined as "grain boundary carbides".

As the shapes of the grain boundary carbides become close to spherical shapes, SSC is less liable to occur from the grain boundary carbides, and the SSC resistance is improved. Therefore, in order to improve the SSC resistance, it is preferable that the carbides including the grain boundary carbides are made spherical.

The carbides can be made spherical to some degree by increasing the tempering temperature. However, the sphericalization of carbides caused by the increase in tempering temperature has a limit. Therefore, it is preferable that the carbides can be further sphericalized by a method other than the method in which the tempering temperature is increased.

Figure 1:
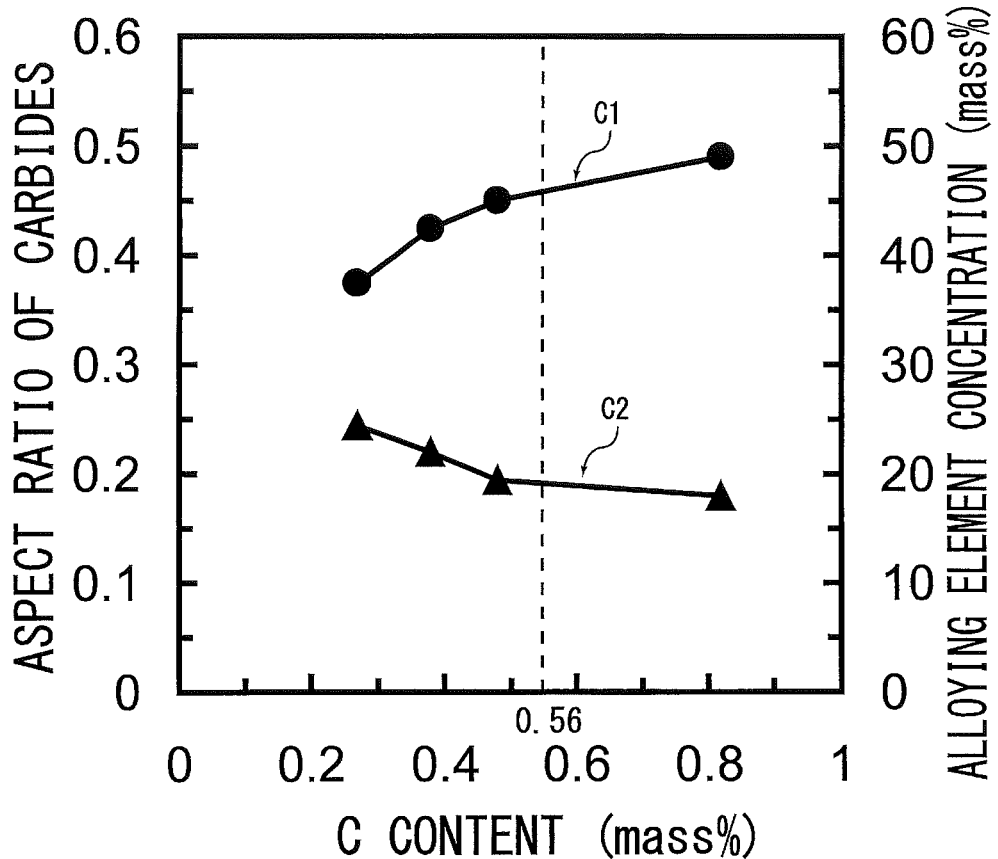
FIG. 1 is a graph showing the relationship of aspect ratio of carbides and alloying element concentration in the carbides to C content.

(2) A carbon content of 0.56% or higher enables further sphericalization of carbides by properly selecting manufacturing conditions such as tempering conditions. Curve c1 in FIG. 1 is a graph showing the relationship between the C content in the low alloy steel and the aspect ratio of carbides. The aspect ratio of carbides, as used herein, is a ratio of an average minor axis to an average major axis, as later-described. As the aspect ratio becomes closer to 1, the extent of sphericalization becomes larger. FIG. 1 was obtained by the method described below. A plurality of plate materials having chemical compositions that are in the range of the present invention and a plurality of plate materials having chemical compositions in which only the C contents deviate from the range of the present invention were prepared. Both of the plate materials were produced by the later-described manufacturing method according to the present invention. Specifically, 50 to 180 kg of each of the steel materials having the above-described chemical composition was melted to produce an ingot. The ingot was hot forged to produce a block. The block was hot rolled to produce a plate material having a thickness of 12 to 15 mm. The plate material was quenched by continuous cooling treatment. At this time, the time period during which the surface temperature of the plate material decreases from the quenching temperature (920°) to the martensite transformation start temperature (Ms point) was within 600 seconds. After being cooled, the plate material was tempered at 700° C. After tempering, from each of the plate materials, a test specimen having a thickness that was the same as the thickness of plate material, a width of 20 mm, and a length of 10 mm was sampled. The test specimen was buried in a resin in the cross-sectional direction of the plate material, and was ground. The ground test specimen was observed under an electron microscope by using the extraction replica method to determine the aspect ratio of carbides. Specifically, five visual fields were observed at a magnification of ×10,000, and the major axes and minor axes of all carbides in the visual fields were measured. At this time, a plurality of axes were measured in each carbide, and the maximum axis was taken as the "major axis", and the minimum axis as the "minor axis". The average of major axes (hereinafter, referred to as the "average major axis") of all carbides measured in the five visual fields was determined. Similarly, the average of minor axes (hereinafter, referred to as the "average minor axis") of all carbides measured in the five visual fields was determined. Based on Formula (A), the aspect ratio of plate material was determined.

Aspect ratio=average minor axis/average major axis (A)

Further, the Cr content, Mo content, and Mn content in ten carbides selected arbitrarily in each visual field were identified by EDX (an energy dispersive X-ray microanalyzer). The average of the total values of the Cr content, Mo content, and Mn content identified in the carbides was defined as an "alloying element concentration" (unit: mass%). By using the aspect ratio and alloying element concentration (%) determined by the above-described methods, FIG. 1 was prepared.

Curve C1 in FIG. 1 represents the aspect ratio of carbides with respect to the C content. Curve C2 in FIG. 1 represents the alloying element concentration (%) with respect to the C content. Referring to FIG. 1, the aspect ratio of carbides increased remarkably with the increase in C content until the C content reached 0.56%. That is, with the increase in C content, the carbides were spher’calized. On the other hand, when the C content exceeded 0.56%, although the aspect ratio increased with the increase in C content, the degree of increase was small as compared with the case where the C content was 0.56% or lower.

The alloying element concentration in the carbides indicated by curve C2 in FIG. 1 decreased remarkably with the increase in C content until the C content reached 0.56%. On the other hand, when the C content became 0.56% or higher, the degree of decrease in the alloying element concentration was small as compared with the case where the C content was lower than 0.56%.

The above findings revealed that if the C content is 0.56% or higher, the carbides are spherical’ized remarkably if manufacturing conditions are properly selected. The reason for this is presumed as described below. The alloying elements (Cr, Mo, and Mn) are contained in the carbides by the substitution for Fe in the carbides. As shown by curve C2 in FIG. 1, when the C content in the steel increases, the alloying element concentration in the carbides decreases, and the Fe concentration in the carbides increases. Therefore, it is presumed that the carbides are spherical’ized.

Figure 2:
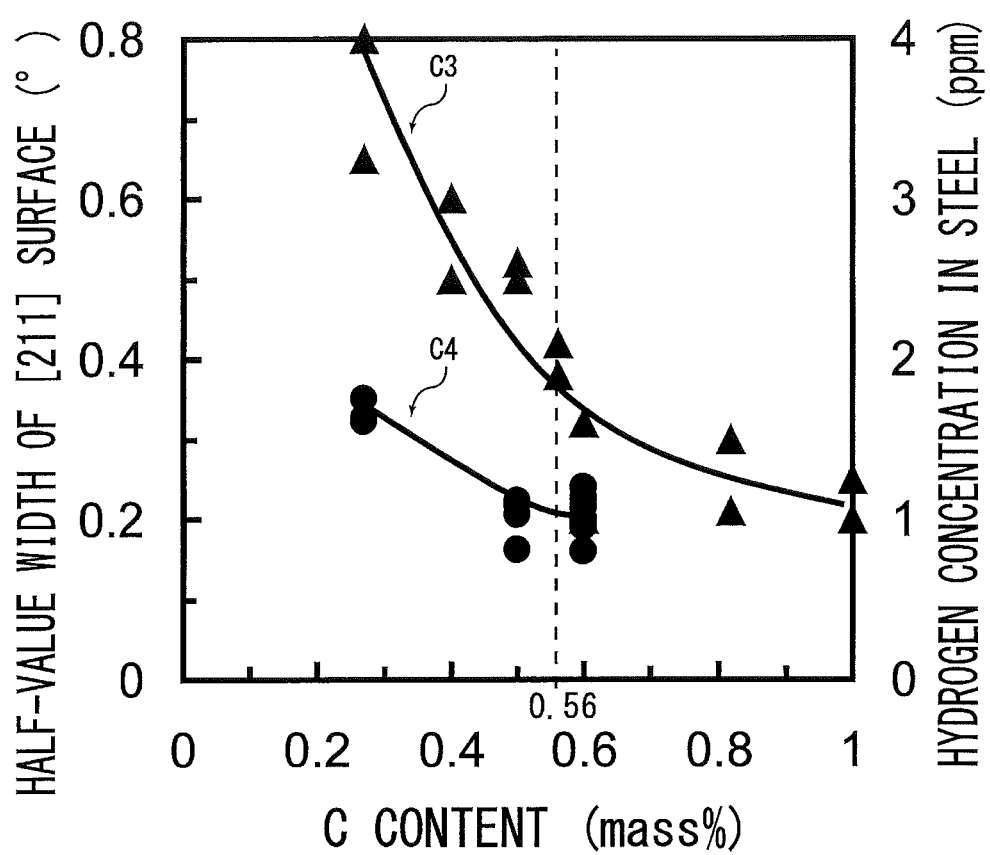
FIG. 2 is a graph showing the relationship of diffraction peak half-value width (°) of [211] surface and hydrogen concentration in steel to C content.

(3) The relationship of the diffraction peak half-value width (having positive correlation with the dislocation density in the steel) of the [211] surface and the hydrogen concentration in the steel to the C content in the steel is as shown in FIG. 2. Here, [211] means [211] crystal plane of α-Fe. FIG. 2 was obtained by the method described below. A plurality of plate materials were prepared in which the contents of elements other than C were in the range of the chemical composition of the present invention, and the C content was changed variously. The prepared plate materials were produced by the same manufacturing method as that at the time when FIG. 1 was obtained. From each of the plate materials having been tempered, a test specimen having a thickness that was the same as the thickness of plate material, a width of 20 mm, and a length of 1 mm was sampled. By using this test specimen, the half-value width of the [211] crystal surface was determined by X-ray diffraction. It is thought that the half-value width reflects the dislocation density in the steel. Further, from each of the plate materials, a test specimen having a thickness of 2 mm, a width of 10 mm, and a length of 40 mm was sampled. The sampled test specimen was immersed in a test bath (normal temperature, and a (5% NaCl+0.5% $CH_3COOH$) aqueous solution, in which hydrogen sulfide gas was saturated) for 336 hours. The immersed test specimen was taken out of the test bath, and the content of diffusible occluded hydrogen in the steel was measured by the temperature programmed desorption method, whereby FIG. 2 was obtained. Curve C3 in FIG. 2 represents the relationship between the C content and the half-value width. The abscissas of FIG. 2 represent the C content (%). Curve C4 in the FIG. 2 represents the relationship between the C content and the hydrogen concentration (ppm) in the steel.

Generally, as the C content increases, the martensite percentage (the volume ratio of martensite to the whole structure of the steel) tends to increase. Referring to FIG. 2, with the increase in C content, the dislocation density in the steel decreased remarkably. Further, the hydrogen concentration in the steel also decreased remarkably with the increase in C content. When the C content was 0.56% or higher, the hydrogen concentration did not decrease so much.

The above findings revealed that with the increase in C content and with the increase in martensite percentage, the dislocation density after tempering decreases, and the hydrogen concentration in the steel also decreases remarkably. The decrease in hydrogen concentration converges in the vicinity of 0.56% of C content, and the hydrogen concentration does not decrease so much when the C content is 0.56% or higher.

Therefore, with the increase in martensite percentage, the dislocation density after tempering decreases. The dislocation serves as a trap site of hydrogen. The decrease in dislocation density decreases the hydrogen concentration in the steel, and improves the SSC resistance.

(4) The dislocation density is proportional to the diffraction peak half-value width (°) of the [211] crystal surface obtained by X-ray diffraction. If the martensite ratio is considered appropriate when the C content is 0.56% or higher, and the half-value width (°) of the [211] crystal surface is 0.50 or smaller, an excellent SSC resistance can be obtained.

(5) As described above, if the C content is 0.56% or higher, and the half-value width (°) of the [211] crystal surface obtained by X-ray diffraction is 0.50 or smaller, the carbides are spherical’ized, and the dislocation density is also decreased, so that the SSC resistance is improved. However, if the C content is 0.56% or higher, quenching cracks caused by martensite transformation may be produced depending on the quenching conditions. In JP2006-265657A, to prevent quenching cracks caused by martensite transformation, isothermal transformation heat treatment (austemper treatment) is performed at 400 to 600° C. after hot working to turn the steel structure into a structure mainly consisting of bainite. However, in the case where the structure of steel having a C content of 0.56% or higher is turned into a structure mainly consisting of bainite, large amounts of carbides are produced at the time of austemper treatment. The produced large amounts of carbides hinder the recovery of dislocation at the tempering time. For this reason, the dislocation density of the steel having been tempered increases. Therefore, the structure of the steel having been quenched preferably contains martensite, not being a single bainite structure. This is because under the quenching conditions under which martensite is produced, large amounts of carbides are less liable to be produced at the quenching time.

(6) It is difficult to quantitatively measure martensite and bainite of the steel having been cooled. However, the hardness of the steel having been quenched (that is, the as-quenched material) increases with increasing the martensite percentage in the steel. If the hardness of the low alloy steel for oil country tubular goods that has been quenched and has not been tempered satisfies Formula (1), martensite of an amount enough to decrease the dislocation density is produced in the steel, and the half-value width of the [211] crystal surface of the steel having been tempered becomes 0.50° or smaller.

$$\text{Rockwell hardness (HRC)} \geq 50 \times C + 26 \quad (1)$$

in which into the symbol of element (C) in Formula (1), the content (mass %) of the corresponding element is substituted.

Figure 3:
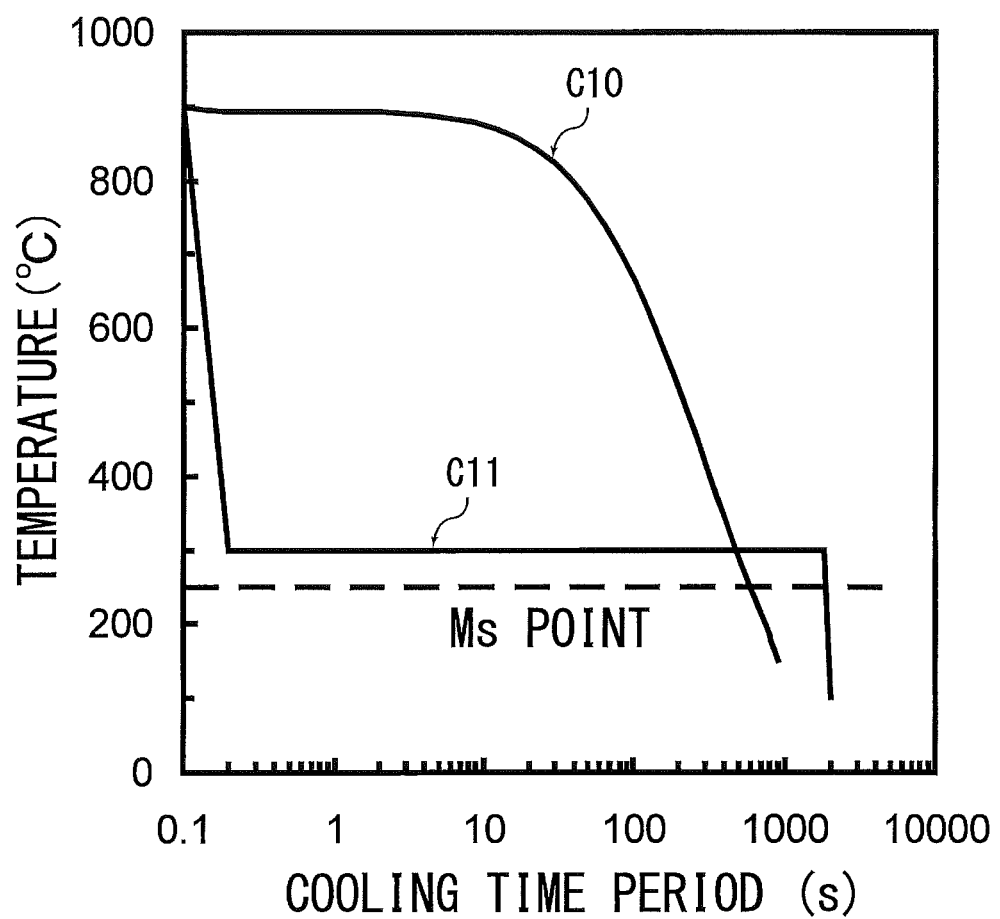
FIG. 3 is a diagram for explaining a quenching step performed by continuous cooling treatment and a quenching step including isothermal treatment according to the present invention.

(7) As the quenching step of the low alloy steel for oil country tubular goods according to the present invention, either of quenching C10 performed by continuous cooling treatment and quenching C11 including isothermal treatment shown in FIG. 3 can be adopted. In quenching C10 performed by continuous cooling treatment, the temperature of steel is decreased continuously by water cooling or oil cooling to quench the steel. Quenching C11 including isothermal treatment is performed as described below. The steel is cooled from the quenching temperature to a temperature exceeding 100° C. and not higher than 300° C. at a cooling rate of 0.7° C./s or higher (hereinafter, this cooling step is referred to as an initial cooling step). After the steel temperature has been decreased to the temperature exceeding 100° C. and not higher than 300° C. by cooling, the cooling is stopped, and the steel is held at the temperature exceeding 100° C. and not higher than 300° C. for a certain period of time (hereinafter, this step is referred to as an isothermal treatment step). Thereafter, the steel is further cooled to normal temperature (hereinafter, this cooling step is referred to as a final cooling step). In short, quenching C11 including isothermal treatment includes the initial cooling step, the isothermal treatment step, and the final cooling step.

The "quenching step including isothermal treatment" in the present invention differs from the austemper described in JP2006-265657A in that the temperature of isothermal treatment is lower than the temperature range in which bainite transformation takes place easily.

In the "quenching step including isothermal treatment" in the present invention, for the isothermal treatment, the steel material is held at a temperature exceeding 100° C. and not higher than 300° C. The isothermal treatment suffices if the steel material is held in the above-described temperature range, and is not limited to the holding of steel material at a fixed temperature.

From the viewpoint of quenching crack control, the isothermal treatment is preferably performed at a temperature exceeding Ms point and not higher than 300° C. In this case, the cooling rate of initial cooling can be increased sufficiently. Although the detailed mechanism is unclear, in this case, it is presumed that the bainite precipitating in some amounts in the process of isothermal treatment restrains quenching cracks from being produced in the final cooling step.

The "isothermal treatment" may be performed in a temperature range of not higher than Ms point and exceeding 100° C. In this case, the cooling rate of initial cooling is restrained. However, if the cooling rate is too low, the hardness of the steel having been quenched becomes too low. At least in the initial cooling, a cooling rate such as to produce ferrite/pearlite or a large amount of bainite should be avoided. Therefore, in this case, the cooling rate at the initial cooling time is preferably 0.7° C./s or higher.

The cooling method for the final cooling is not subject to any special restriction. However, a steel having a shape such that quenching cracks are easily produced, such as a thick-wall steel pipe, is preferably cooled at a low cooling rate.

In the case where the quenching performed by continuous cooling treatment is adopted, if the time period during which the steel temperature decreases from the quenching temperature (850 to 920° C.) to Ms point (hereinafter, referred to as "Ms point passage time") is within 600 seconds, Formula (1) is satisfied, and the half-value width of the [211] crystal surface of the steel having been tempered is 0.50° or smaller. Therefore, a low alloy steel for oil country tubular goods having an excellent SSC resistance can be obtained. On the other hand, in order to restrain quenching cracks, the Ms point passage time is preferably 100 seconds or longer.

In the case where the quenching including isothermal treatment is adopted, if the initial cooling stop temperature and the isothermal treatment temperature exceed 100° C. and are 300° C. or lower, Formula (1) is satisfied, and quenching cracks are restrained.

(8) It is known that quenching tends to cause quenching cracks in a low alloy steel containing C: 0.30% or higher. It is generally assumed that quenching cracks are caused by stress generated by martensite transformation and, as the C concentration increases, lattice strain becomes larger, leading to increased stress.

A steel pipe has circumferential restraints compared with a steel plate. A stress on a steel pipe is more complicated than a stress on a steel plate. Therefore, quenching cracks are generated more often in a steel pipe than in a steel plate. Moreover, quenching cracks are likely to occur if the steel pipe has a large wall thickness. A steel pipe containing C: 0.30% or higher and having an outer diameter of 100 to 400 mm and a wall thickness of 5 to 100 mm is likely to develop quenching cracks; particularly, a steel pipe containing C: 0.50% or higher almost always develops quenching cracks. If the method of (7) described above is used, a steel pipe of a low alloy steel containing C: 0.56% or higher can be quenched with an appropriate amount of martensite, thereby realizing carbide conditions that are considered appropriate or half-value widths without causing quenching cracks.

Based on the above-described findings, the present inventors completed the present invention. Hereunder, the low alloy steel for oil country tubular goods according to the embodiment of the present invention is explained.

[Chemical Composition]

The low alloy steel for oil country tubular goods according to the present invention has the chemical composition described below.

C: 0.56 to 1.00%

In the low alloy steel for oil country tubular goods according to the present invention, the content of carbon (C) is higher than that of the conventional low alloy steel for oil country tubular goods. Containing of much C promotes the sphericalization of carbides at grain boundaries, and improves the SSC resistance of steel. Further, containing of much C promotes martensite transformation in steel. As a result, the recovery of dislocation is promoted at the tempering time, and the dislocation density of the steel having been tempered is decreased. On the other hand, if C is contained excessively, the effects saturate. Therefore, the C content is 0.56 to 1.00%. The lower limit of C content is preferably 0.58%, further preferably 0.61%. The upper limit of C content is preferably 0.80%, further preferably 0.70%.

Si: 0.05 to 0.50%

Silicon (Si) deoxidizes steel. On the other hand, if Si is contained excessively, the effect saturates. Therefore, the Si content is 0.05 to 0.50%. The lower limit of Si content is preferably 0.10%, further preferably 0.13%. The upper limit of Si content is preferably 0.35%, further preferably 0.30%.

Mn: 0.05 to 1.00%

Manganese (Mn) enhances the hardenability of steel. On the other hand, if Mn is contained excessively, it segregates at grain boundaries together with impurity elements such as phosphorous (P) and sulfur (S). As a result, the SSC resistance of steel deteriorates. Therefore, the Mn content is 0.05 to 1.00%. The lower limit of Mn content is preferably 0.10%, further preferably 0.35%. The upper limit of Mn content is preferably 0.60%, more preferably 0.50%, further more preferably 0.47%.

P: 0.025% or Less

Phosphorous (P) is an impurity and segregates at grain boundaries, and deteriorates the SSC resistance of steel. For this reason, the P content is preferably as low as possible. Therefore, the P content is 0.025% or less. The P content is preferably 0.018% or less, more preferably 0.014% or less.

S: 0.010% or Less

Sulfur (S) is an impurity and segregates at grain boundaries like P, and deteriorates the SSC resistance of steel. For this reason, the S content is preferably as low as possible. Therefore, the S content is 0.010% or less. The S content is preferably 0.005% or less, further preferably 0.003% or less, further preferably 0.0015 or less.

Al: 0.005 to 0.100%

Aluminum (Al) deoxidizes steel. On the other hand, if Al is contained excessively, the effect saturates and likely to cause an increase in inclusions. Therefore, the Al content is 0.005 to 0.100%. The lower limit of Al content is preferably 0.010%, further preferably 0.020%. The upper limit of Al content is preferably 0.060%, further preferably 0.050%. The content of "Al" in this description means the content of "acid-soluble Al", that is, "sol.Al".

Mo: 0.40 to 1.00%

Molybdenum (Mo) forms MC (M: Mo and V), which is a fine carbide, together with V described later. This raises the steel tempering temperature for obtaining a yield stress of 862 MPa or higher (125 ksi or higher). For this reason, the carbides at grain boundaries are sphericalized, and the dislocation density is decreased. On the other hand, if Mo is contained excessively, the effect saturates. Therefore, the Mo content is 0.40 to 1.00%. The lower limit of Mo content is preferably 0.65%, further preferably 0.70%. The upper limit of Mo content is preferably 0.90%, further preferably 0.80%.

V: 0.07 to 0.30%

Vanadium (V) forms MC (M: Mo and V), which is a fine carbide, together with Mo to raise the steel tempering temperature for obtaining a yield stress of 862 MPa or higher. On the other hand, if V is contained excessively, the amount of V dissolving at the quenching time saturates, and also the effect of raising the tempering temperature saturates. Therefore, the V content is 0.07 to 0.30%. The lower limit of V content is preferably 0.08%. The upper limit of V content is preferably 0.20%, further preferably 0.15%.

O: 0.010% or Less

Oxygen (O) is an impurity. If O is contained excessively, coarse oxides are produced, and the toughness and SSC resistance of steel are deteriorated. For this reason, the O content is preferably as low as possible. Therefore, the O content is 0.010% or less.

N: 0.0300% or Less

Nitrogen (N) combines with Al, Nb, Ti or Zr to form nitrides or carbo-nitrides, so that the steel structure is made fine by means of the pinning effect. The lower limit of N content is preferably 0.0030%, further preferably 0.0040%. The upper limit of N content is preferably 0.0200%, further preferably 0.0150%.

N is an impurity in manufacturing of steel. If the effects of nitrides or carbo-nitrides are not pursued as above, the present invention does not exclude the possibility of including N, an impurity, in less than 0.0030%.

The balance of the chemical composition of the low alloy steel for oil country tubular goods consists of Fe and impurities. The "impurities" referred to herein are elements that mixedly enter from the ore and scrap used as raw materials for steel or from the environments and the like of the production process.

[Concerning Optional Element]

The low alloy steel for oil country tubular goods may further contain Cr in place of some of Fe.

Cr: 2.00% or Less

Chromium (Cr) is an optional element. Cr enhances the hardenability of steel. On the other hand, if Cr is contained excessively, the effect saturates. Therefore, the Cr content is 2.00% or less. If the Cr content is 0.10% or more, the above-described effect can be achieved remarkably. However, even if the Cr content is less than 0.10%, the above-described effect can be achieved to some degree. The lower limit of Cr content is preferably 0.50%. The upper limit of Cr content is preferably 1.50%, further preferably 1.20%.

The low alloy steel for oil country tubular goods may further contain, in place of some of Fe, one or more kinds selected from a group consisting of Nb, Ti and Zr.

Nb: 0.100% or less
Ti: 0.100% or less
Zr: 0.100% or less

All of niobium (Nb), titanium (Ti), and zirconium (Zr) are optional elements. These elements combine with C or N to form carbides, nitrides, or carbo-nitrides. The precipitates (carbides, nitrides, and carbo-nitrides) of these elements make the steel structure fine by means of the pinning effect. If one or more kinds selected from a group consisting of Nb, Ti and Zr are contained even in a small amount, the above-described effect can be achieved. On the other hand, if Nb, Ti or Zr is contained excessively, the effect saturates. Therefore, the Nb content is 0.100% or less, the Ti content is 0.100% or less, and the Zr content is 0.100% or less. If the Nb content is 0.002% or more, if the Ti content is 0.002% or more, or if the Zr content is 0.002% or more, the above-described effect is achieved remarkably. The lower limit of Nb content, Ti content, or Zr content is preferably 0.005%. The upper limit of Nb content, Ti content, or Zr content is preferably 0.050%.

The low alloy steel for oil country tubular goods according to this embodiment may further contain Ca in place of some of Fe.

Ca: 0.0100% or Less

Calcium (Ca) is an optional element. Ca combines with S in the steel to form sulfides, improving the shapes of inclusions, and therefore enhances the SSC resistance. If Ca is contained even in a small amount, the above-described effect can be achieved. On the other hand, if Ca is contained excessively, the effects saturate. Therefore, the Ca content is 0.0100% or less. The lower limit of Ca content is preferably 0.0003%, further preferably 0.0005%. The upper limit of Ca content is preferably 0.0030%, further preferably 0.0020%.

The low alloy steel for oil country tubular goods according to this embodiment may further contain B in place of some of Fe.

B: 0.0030% or Less

Boron (B) is an optional element. B enhances the hardenability of steel. On the other hand, if B is contained excessively, the effect saturates. Therefore, the B content is 0.0030% or less. The lower limit of B content is preferably 0.0003%, further preferably 0.0005%. The upper limit of B content is preferably 0.0015%, further preferably 0.0012%

[Micro-structure and Dislocation Density]

The micro-structure of the low alloy steel for oil country tubular goods according to this embodiment consists of a mixed structure of tempered martensite and tempered bainite. More specifically, the micro-structure of the low alloy steel for oil country tubular goods consists mainly of tempered martensite and tempered bainite, and may besides contain precipitates such as carbides, nitrides, and carbonitrides, inclusions, and retained austenite. However, the retained austenite percentage (the volume ratio of retained austenite to the whole structure: unit of %) is 5% or lower. This is because the retained austenite produces variations in strength. The micro-structure of the low alloy steel for oil country tubular goods may be the single phase of tempered martensite, in the case that the wall thickness of the tubular good is relatively thin and the probability of occurrence of quenching cracking is negligibly low. The retained austenite percentage is measured by the X-ray diffraction method as described below. Specifically, a specimen including the central portion of thickness of the produced steel plate or steel pipe is sampled. The surface of the sampled specimen is chemically polished. On the chemically polished surface, X-ray diffraction is performed by using CoKα rays as incident X-rays. From the surface integrated intensity of the (211) surface, (200) surface, and (110) surface of ferrite and the (220) surface, (200) surface, and (111) surface of austenite, the retained austenite percentage is determined.

Further, in the low alloy steel for oil country tubular goods according to this embodiment, the diffraction peak half-value width of the [211] crystal surface obtained by the X-ray diffraction method is 0.50° or smaller.

The half value width can be determined in the following manner. X-ray diffraction is performed on the polished surface of a test specimen. X-ray diffraction is performed using CoKα rays (wavelength: 1.7889 Å) at 30 kV and 100 mA. Kα1 and Kα2 components in the CoKα rays are separated from each other by fitting to extract Kα1 components only, and the half value width (°) in diffraction of Kα1 rays on the αFe [221] surface of the test specimen is determined. Using a peak-top method, the half value of a peak height is measured as a half value width. Further, the half value width derived from the X-ray diffraction equipment is measured using single crystal (ideal single crystal having no half value width) of LaB6 (lanthanum hexaboride). The measured half value width associated with the equipment is subtracted from the measured half value width for correction. The corrected value constitutes the half value width of a diffraction peak for the [211] crystal surface.

If the half-value width is 0.50° or smaller, hydrogen is less liable to accumulate in the steel because the dislocation density is low, and the SSC resistance is improved. On the other hand, if the half-value width exceeds 0.50°, the dislocation density is high, so that the SSC resistance is deteriorated.

[Manufacturing Method]

One example of the manufacturing method for the low alloy steel for oil country tubular goods according to this embodiment is explained. In this example, the manufacturing method for a seamless steel pipe is explained.

The steel having the above-described chemical composition is melted, and is refined by the well-known method. Successively, the molten steel is cast into a continuously cast material by the continuous casting process. The continuously cast material is, for example, a slab, bloom, or billet. Also, the molten steel may be cast into an ingot by the ingot making method.

The slab, bloom, or ingot is hot worked into a steel material. The steel material is a billet, for example. The billet may be formed by hot rolling or by hot forging.

The steel material produced by continuous casting or hot working is hot worked into a hollow shell. For example, the Mannesmann process is carried out as hot working to form the hollow shell. The hollow shell may be produced by any other hot working method.

The hot-worked steel material (hollow shell) is quenched. As described above, in this description, both of quenching C10 performed by continuous cooling treatment and quenching C11 including isothermal treatment shown in FIG. 3 are defined as "quenching".

In both of the quenching operations (quenching performed by continuous cooling treatment and quenching including isothermal treatment), the quenching temperature of steel material (surface temperature at the quenching time of steel material) is preferably 850 to 920° C.

In the case of the quenching performed by continuous cooling treatment, as shown by curve C10 in FIG. 3, the surface temperature of steel material decreases continuously from the quenching temperature. As the continuous cooling treatment method, for example, a method in which the steel material is immersed in a water tank or an oil tank or a method in which the steel material is cooled by shower water cooling is available. In the continuous cooling treatment, the time period during which the surface temperature of steel material decreases from the quenching temperature to Ms point (referred to as Ms point passage time) is within the range of 100 seconds to 600 seconds. If the Ms point passage time exceeds 600 seconds, a hardness satisfying Formula (1) is not obtained, and the martensite percentage in the steel structure is too low. Therefore, an excellent SSC resistance cannot be obtained. On the other hand, if the Ms point passage time is shorter than 100 seconds, the possibility of production of quenching cracks increases.

In the case of the quenching including isothermal treatment, as shown by curve C11 in FIG. 3, after being cooled by the initial cooling, the steel material is held at a temperature exceeding 100° C. and not higher than 300° C. for a certain period of time (isothermal treatment). In the case of the quenching including isothermal treatment, quenching cracks are less liable to be produced. The cooling stop temperature of the initial cooling is higher than 100° C. and not higher than 300° C. If the cooling stop temperature exceeds 300° C., the bainite percentage in the steel structure increases excessively, and large amounts of carbides are produced. For this reason, in the tempering treatment, the dislocation is less liable to be recovered, and the dislocation density is less liable to be decreased. Therefore, the hardness of the steel having been cooled does not satisfy Formula (1), and an excellent SSC resistance cannot be obtained. The holding time in the isothermal treatment is preferably 5 to 60 minutes. After the isothermal treatment, the steel material is subjected to final cooling. The final cooling may be water cooling or air cooling. In other words, the cooling rate at the final cooling time is not subject to any special restriction.

If the steel material is a hollow shell (steel pipe) and quenching is performed by continuous cooling treatment as described above, the cooling rate in the time period where the temperature of the outer surface of the steel pipe falls from 800° C. to 500° C. can be represented by $CR_{8-5}$ (° C./s). If the hollow shell has a C content of about 0.6% the cooling rate $CR_{8-5}$ preferably satisfies the following Formula (2):

$$CR_{8-5} \leq 2837 t^{-2.2} \quad (2)$$

where t is the wall thickness of the steel pipe (in mm).

If the cooling rate $CR_{8-5}$ satisfies Formula (2), quenching cracks can be reduced. During quenching, a time lag occurs in martensite transformation between the outer and inner sides of the hollow shell (steel pipe). Thus, it is considered that a residual stress is generated in the steel pipe, which may cause quenching cracks. The residual stress during quenching may be obtained by stress-strain distribution analysis using the finite element method (FEM). It was found out that quenching cracks in the steel pipe of the present invention may be reduced if the residual tensile stress is 200 MPa or below after the residual stress value from an FEM analysis is compared with an actual quenching behavior of the steel pipe.

As the wall thickness t (mm) of the steel pipe increases, a time lag occurs in martensite transformation between the inner and outer surfaces of the steel pipe, increasing residual tensile stress. If the cooling rate is relatively small, the time lag in martensite transformation as described above is relatively small, leading to a smaller residual tensile stress, thereby reducing quenching cracks.

Figure 4:
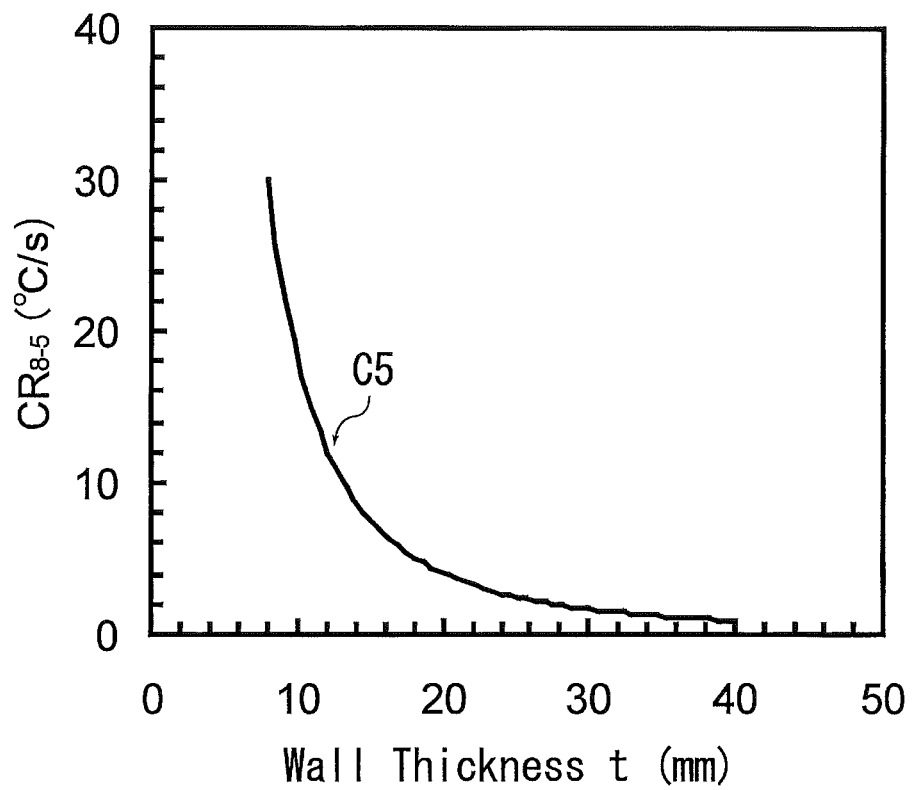
FIG. 4 is a graph showing the relationship between the wall thickness of a steel pipe t (mm) and the critical cooling rate (° C./s), which does not cause quenching cracks and is measured as the temperature of the outer surface of the steel pipe falls from 800° C. to 500° C., according to the first manufacturing method of the present invention.

FIG. 4 is a graph showing the relationship between the wall thickness of a steel pipe t (mm) and the critical cooling rate (° C./s), which does not cause quenching cracks and is measured as the temperature of the outer surface of the steel pipe falls from 800° C. to 500° C., according to the first manufacturing method of the present invention. The curve C5 in FIG. 4 represents the right side of Formula (2) (=2837 $t^{-2.2}$). The curve C5 indicates the relationship between the cooling rate $CR_{8-5}$ (° C./s) and the wall thickness of a steel pipe t (mm) such that the residual tensile stress is 200 MPa. Quenching cracks are reduced in the region below the curve C5. Quenching cracks are often generated in the region above the curve C5. Thus, it is preferable that the steel pipe is cooled such that the cooling rate $CR_{8-5}$ satisfies Formula (2) during cooling. In this case, according to the first manufacturing method of the present invention, a seamless steel pipe having a half-value width of a [211] crystal surface of 0.50° or less without quenching cracks or with quenching cracks being reduced can be successfully manufactured, particularly if the seamless steel pipe has an outer diameter of 100 to 400 mm and a wall thickness of 5 to 45 mm.

After the quenching performed by continuous cooling treatment or the quenching including isothermal treatment has been performed, tempering is performed. The tempering temperature is controlled as appropriate according to the chemical composition of steel material and the yield stress to be obtained. The tempering temperature is, for example, 650 to 735° C. By the tempering treatment, the yield stress of steel material is controlled so as to be 862 MPa or higher. In this embodiment, the "yield stress" means a 0.2% proof stress.

In the above-described producing method, quenching is performed after hot working. However, normalizing treatment may be performed between the hot working and the quenching. Specifically, the steel material (hollow shell) having been hot worked is held at a temperature higher than A3 point (for example, 850 to 950° C.) for a certain period of time, and thereafter is allowed to cool. The holding time is, for example, 5 to 60 minutes.

In the normalizing treatment, usually, after hot working, the steel material is cooled to normal temperature, and thereafter is heated to a temperature not lower than $A_{c3}$ point. However, the normalizing treatment in this embodiment may be performed by holding the steel material at a temperature not lower than $A_{r3}$ point as it is after hot working.

If the normalizing treatment is performed, the crystal grains of steel are made fine. Specifically, after the quenching performed after the normalizing treatment (that is, in the as-quenched material), the grain size number of prior-austenite grain boundary becomes 10 or more specified in ASTM E112. The refinement of crystal grains further improves the SSC resistance. In particular, the low alloy steel for oil country tubular goods having a yield stress of 925 MPa or higher is provided with a further excellent SSC resistance by the performing of normalizing treatment.

The half-value width of the [221] crystal surface of the low alloy steel for oil country tubular goods (seamless steel pipe) produced by the above-described steps, which is obtained by X-ray diffraction, is 0.50° or smaller. Therefore, the steel is excellent in SSC resistance.

In the above manufacturing method, a method of manufacturing a seamless steel pipe has been illustrated where the steel material is a hollow shell or steel pipe. However, the shape of the steel material is not limited thereto. The steel material may be a steel plate, a steel rod or a steel wire.

EXAMPLE 1

Ingots of steels A to Z and steels AA to AC having the chemical compositions given in Table 1 were produced.

TABLE 1

| Classification | Steel type | Chemical composition (unit: mass %, the balance being Fe and impurities) | | | | | | | | | | | | | | |
|---|---|---|---|---|---|---|---|---|---|---|---|---|---|---|---|---|
| | | C | Si | Mn | P | S | Cr | Mo | Nb | Ti | B | sol · Al | N | V | O | Ca | Zr |
| Example embodiment of the present invention | A | 0.59 | 0.21 | 0.49 | 0.009 | 0.001 | 1.28 | 0.75 | 0.033 | — | — | 0.041 | 0.0110 | 0.10 | 0.002 | — | — |
| | B | 0.63 | 0.20 | 0.45 | 0.008 | 0.001 | 1.25 | 0.75 | 0.025 | — | — | 0.028 | 0.0100 | 0.10 | 0.001 | — | — |
| | C | 0.60 | 0.20 | 0.45 | 0.008 | 0.001 | 0.48 | 0.75 | 0.025 | — | — | 0.030 | 0.0095 | 0.10 | 0.001 | — | — |
| | D | 0.61 | 0.22 | 0.46 | 0.014 | 0.001 | 0.97 | 0.70 | 0.034 | 0.009 | — | 0.037 | 0.0040 | 0.10 | 0.001 | — | — |
| | E | 0.61 | 0.20 | 0.45 | 0.012 | 0.001 | 0.97 | 0.70 | 0.030 | 0.008 | — | 0.037 | 0.0047 | 0.10 | 0.001 | — | — |
| | F | 0.60 | 0.21 | 0.45 | 0.010 | 0.001 | 1.02 | 0.71 | 0.031 | — | — | 0.036 | 0.0047 | 0.10 | 0.001 | — | — |
| | G | 0.62 | 0.20 | 0.45 | 0.011 | 0.001 | 0.50 | 0.70 | 0.031 | — | — | 0.039 | 0.0040 | 0.10 | 0.001 | — | — |
| | H | 0.62 | 0.19 | 0.45 | 0.014 | 0.001 | 1.03 | 0.71 | 0.030 | 0.008 | — | 0.036 | 0.0039 | 0.10 | 0.001 | — | — |
| | I | 0.56 | 0.20 | 0.45 | 0.010 | 0.001 | 1.02 | 0.70 | 0.030 | 0.008 | — | 0.035 | 0.0040 | 0.10 | 0.001 | — | — |
| | J | 0.82 | 0.20 | 0.45 | 0.010 | 0.001 | 1.24 | 0.72 | 0.016 | — | — | 0.034 | 0.0140 | 0.10 | 0.002 | — | — |
| | K | 0.70 | 0.19 | 0.44 | 0.010 | 0.001 | — | 0.70 | 0.030 | — | — | 0.036 | 0.0045 | 0.10 | 0.001 | — | — |
| | L | 0.60 | 0.20 | 0.45 | 0.012 | 0.001 | 1.00 | 0.50 | 0.015 | 0.008 | — | 0.030 | 0.0040 | 0.10 | 0.001 | 0.0020 | — |
| | M | 0.60 | 0.20 | 0.45 | 0.012 | 0.001 | 1.00 | 0.70 | 0.015 | 0.008 | — | 0.030 | 0.0040 | 0.20 | 0.001 | 0.0020 | — |
| | N | 0.61 | 0.19 | 0.45 | 0.009 | 0.001 | 0.49 | 0.71 | — | — | 0.0010 | 0.030 | 0.0050 | 0.10 | 0.001 | — | — |
| | O | 0.61 | 0.21 | 0.45 | 0.010 | 0.001 | 1.01 | 0.70 | 0.030 | 0.008 | — | 0.030 | 0.0040 | 0.10 | 0.001 | — | 0.030 |
| | AB | 0.61 | 0.20 | 0.44 | 0.008 | 0.001 | — | 0.98 | — | — | — | 0.032 | 0.0035 | 0.11 | 0.001 | — | — |
| | AC | 0.61 | 0.21 | 0.45 | 0.009 | 0.001 | 1.25 | 0.72 | — | — | — | 0.029 | 0.0044 | 0.09 | 0.001 | — | — |

TABLE 1-continued

| Classification | Steel type | Chemical composition (unit: mass %, the balance being Fe and impurities) | | | | | | | | | | | | | | | |
|---|---|---|---|---|---|---|---|---|---|---|---|---|---|---|---|---|---|
| | | C | Si | Mn | P | S | Cr | Mo | Nb | Ti | B | sol·Al | N | V | O | Ca | Zr |
| Comparative example | P | 0.38* | 0.21 | 0.47 | 0.008 | 0.001 | 1.25 | 0.72 | 0.033 | — | — | 0.021 | 0.0100 | 0.10 | 0.001 | — | — |
| | Q | 0.48* | 0.20 | 0.44 | 0.007 | 0.001 | 1.01 | 0.68 | 0.034 | — | — | 0.034 | 0.0110 | 0.09 | 0.001 | — | — |
| | R | 0.52* | 0.20 | 0.45 | 0.011 | 0.001 | 0.97 | 0.70 | 0.031 | 0.008 | — | 0.037 | 0.0052 | 0.10 | 0.001 | — | — |
| | S | 0.50* | 0.19 | 0.46 | 0.013 | 0.001 | 1.00 | 0.71 | 0.034 | 0.008 | — | 0.037 | 0.0048 | 0.10 | 0.001 | — | — |
| | T | 0.49* | 0.20 | 0.45 | 0.012 | 0.001 | 1.02 | 0.73 | 0.033 | — | — | 0.037 | 0.0049 | 0.10 | 0.001 | — | — |
| | U | 0.50* | 0.19 | 0.43 | 0.014 | 0.001 | 1.03 | 0.70 | 0.030 | 0.008 | — | 0.036 | 0.0041 | 0.10 | 0.001 | — | — |
| | V | 0.60 | 0.20 | 1.20* | 0.012 | 0.001 | 1.02 | 0.72 | 0.031 | — | — | 0.036 | 0.0040 | 0.10 | 0.001 | — | — |
| | W | 0.60 | 0.20 | 0.45 | 0.030* | 0.001 | 1.02 | 0.72 | 0.031 | — | — | 0.036 | 0.0040 | 0.10 | 0.001 | — | — |
| | X | 0.61 | 0.21 | 0.45 | 0.010 | 0.011* | 1.01 | 0.73 | 0.033 | — | — | 0.036 | 0.0041 | 0.10 | 0.001 | — | — |
| | Y | 0.60 | 0.20 | 0.45 | 0.010 | 0.001 | 1.02 | 0.30* | 0.030 | — | — | 0.034 | 0.0040 | 0.10 | 0.001 | — | — |
| | Z | 0.60 | 0.19 | 0.46 | 0.014 | 0.001 | 1.05 | 0.71 | — | 0.008 | — | 0.039 | 0.0045 | —* | 0.001 | — | — |
| | AA | 0.60 | 0.20 | 0.45 | 0.010 | 0.001 | 1.02 | 0.70 | 0.030 | 0.010 | — | 0.030 | 0.0040 | 0.10 | 0.011* | — | — |

Note:
*mark indicates that the value is out of the range defined in the present invention.

Any of the chemical compositions of steels A to O and steels AB and AC was within the range of chemical composition of the present invention. On the other hand, the C content of each of steels P to U was lower than the lower limit of C content of the present invention. The Mn content of steel V exceeded the upper limit of Mn content of the present invention. The P content of steel W exceeded the upper limit of P content of the present invention. The S content of steel X exceeded the upper limit of S content of the present invention. The Mo content of steel Y was lower than the lower limit of Mo content of the present invention. Steel Z did not contain V. The O (oxygen) content of steel AA exceeded the upper limit of O content of the present invention.

The weight of each of the ingots was 30 to 150 kg. From each of the ingots, a block was sampled. The block was heated to 1250° C. The heated block was hot forged and hot rolled to produce a plate material having a thickness of 15 to 25 mm.

The produced plate material was subjected to quenching and tempering treatment or subjected to quenching and tempering treatment after being subjected to normalizing treatment to control the yield stress of plate material to 125 ksi class (862 MPa to 965 MPa) and 140 ksi class (965 MPa to 1068 MPa).

In the normalizing treatment, the plate material was soaked at a temperature not lower than $A_{C3}$ point (920° C.) for 10 minutes, and thereafter was allowed to cool by the well-known method. On the other hand, the quenching and tempering treatment was performed as described below.

[Quenching]

The quenching temperature at the quenching time was controlled to the range of 850 to 920° C.

[Quenching Performed by Continuous Cooling Treatment]

In the case where the quenching performed by continuous cooling treatment was performed, after the plate material had been heated to the quenching temperature, the time period during which the surface temperature of plate material decreases from the quenching temperature to the martensite transformation start temperature (Ms point) (Ms point passage time) was controlled by shower cooling, mist cooling, or air cooling.

[Quenching Including Isothermal Treatment]

In the case where the quenching including isothermal treatment was performed, the initial cooling was performed at a cooling rate of 5° C./s or higher by salt bath cooling or water cooling. In an intermediate point of cooling, the plate material was pulled up, whereby the initial cooling stop temperature was changed. After being held at the stop temperature for 25 to 40 minutes (the isothermal treatment), the plate material was water-cooled to normal temperature (the final cooling).

[Test of As-quenched Material]

On the plate material having been quenched (hereinafter, referred to as the "as-quenched material"), the following tests were conducted.

[Hardness Test of As-quenched Material]

The hardness of the as-quenched material was measured by the method described below. The as-quenched material was cut in the plate thickness direction. The Rockwell hardness HRC in the central portion of the plate thickness of the cut surface was determined based on JIS G0202. Specifically, the Rockwell hardness HRC was determined at arbitrary three points in the central portion of the plate thickness of the cut surface. The average of the Rockwell hardnesses HRC determined at three points was defined as the hardness of the corresponding test number.

[Pre-austenite Crystal Grain Size Test]

Further, by using the as-quenched material, a pre-austenite crystal grain size test was conducted. Specifically, the as-quenched material was cut in the plate thickness direction. The cut plate material was buried in a resin, and the cut surface was etched with picric acid. The etched surface was observed, and the grain size number of the pre-austenite crystal grain was determined in conformity to ASTM E112.

[Tempering]

The plate material having been quenched was subjected to tempering treatment, and the yield stress of the plate material was controlled to 125 ksi class (862 MPa to 965 MPa) and 140 ksi class (965 MPa to 1068 MPa). The tempering temperature was 650 to 735° C.

[Test on Plate Material having been Tempered]

By using the plate material having been subjected to quenching and tempering, the following evaluation tests were conducted.

[Half-value Width Measurement Test and Retained Austenite Percentage Test]

From the plate material having been tempered, a test specimen was sampled. The surface of the test specimen was polished with an emery paper. With the progress of polishing, an emery paper having a finer grain size was used. After the surface of the test specimen had been polished with a #1200 emery paper, the test specimen was immersed in normal-temperature hydrogen peroxide water containing a minute amount of hydrofluoric acid, and a work hardened layer formed on the surface of the test specimen was removed by polishing. On the test specimen from which the work hardened layer had been removed, X-ray diffraction was performed. X-ray diffraction was performed using CoKα rays (wavelength: 1.7889 Å) at 30 kV and 100 mA. Kα1 and Kα2 components in the CoKα rays were separated from each other by fitting to extract Kα1 components only, and the half value width (°) in diffraction of Kα1 rays on the αFe [221] surface of the test specimen was determined. The half value of a peak height was measured as a half value width (peak-top method). Further, the half value width derived from the equipment was measured using single crystal (ideal single crystal having no half value width) of LaB6 (lanthanum hexaboride), and the measured half value width associated with the equipment was subtracted from the actually measured value for correction. The corrected value constituted the half value width of each test specimen.

Further, by the above-described X-ray diffraction method, the retained austenite percentage (the volume ratio of retained austenite to the whole structure (%)) was measured. Specifically, a specimen including a central portion in the thickness direction of steel material was sampled. The surface of the sampled specimen was chemically polished. On the chemically polished surface, X-ray diffraction was carried out by using CoKα rays (wavelength: 1.7889 Å) as incident X-rays. From the surface integrated intensity of the (211) surface, (200) surface, and (110) surface of ferrite and the (220) surface, (200) surface, and (111) surface of austenite, the retained austenite percentage was determined.

[Yield Stress Test]

From each of the plate materials having been tempered, a round-bar tensile test specimen having a parallel part of 6 mm in outside diameter and 40 mm in length was sampled. By using the sampled round-bar tensile test specimen, a tensile test was conducted at normal temperature (25° C.) to determine the yield stress (0.2% proof stress).

[SSC Resistance Test]

In the SSC resistance test, a bath to c bath were used. By using the a bath and b bath, a constant-load tensile test was conducted. By using the c bath, an autoclave test was conducted.

[Constant-load Tensile Test]

From each of the plate materials, a round-bar tensile test specimen having a parallel part extending in the roll direction was sampled. The outside diameter of the parallel part was 6.35 mm, and the length thereof was 25.4 mm. Based on NACE TM0177 Method A, a constant-load tensile test was conducted in a test bath at normal temperature (25° C.). As the test bath, the a bath and b bath were prepared. The a bath was a normal-temperature 5% NaCl+0.5% $CH_3COOH$ aqueous solution in which hydrogen sulfide gas of 1 atm was saturated. The b bath was a normal-temperature 5% NaCl+0.5% $CH_3COOH$ aqueous solution in which hydrogen sulfide gas of 0.1 atm (the balance being carbon dioxide gas) was saturated.

On the plate material having a yield stress close to 125 ksi (862 MPa), the SSC resistance test was conducted by using the a bath. Specifically, the test specimen was immersed in the a bath. Then, to the test specimen in the a bath, a constant load of 850 of 125 ksi (862 MPa) was applied. After 720 hours had elapsed, it was observed whether or not a rupture had occurred on the test specimen. It was evaluated that the plate material on which no rupture had occurred was excellent in SSC resistance.

On the plate material having a yield stress close to 140 ksi, the SSC resistance test was conducted by using the b bath. Specifically, the test specimen was immersed in the b bath. Then, to the test specimen in the b bath, a constant load of 900 of actual yield stress (yield stress of each test number) was applied. After 720 hours had elapsed, it was visually observed whether or not a crack had been produced on the test specimen. It was evaluated that the plate material on which no crack had been produced was excellent in SSC resistance.

[Autoclave Test]

An autoclave test was conducted by using the c bath to evaluate the SSC resistance. The c bath was a normal-temperature 5% NaCl aqueous solution in which hydrogen sulfide of 10 atm was saturated.

From each of the plate materials, a four-point bending test specimen of 2 mm×10 mm×75 mm was sampled. By using a four-point bending jig, a stress of 90% of actual yield stress (yield stress of each test number) was applied to the sampled four-point bending test specimen in conformity to ASTM G39. The four-point bending test specimen to which the stress had been applied was placed in an autoclave. After the four-point bending test specimen had been placed, the deaerated 5% NaCl aqueous solution was poured into the autoclave. Thereafter, hydrogen sulfide of 10 atm was enclosed. By the above-described steps, the c bath was prepared in the autoclave, and the four-point bending test specimen was immersed in the c bath. After 720 hours had elapsed from the enclosure of hydrogen sulfide of 10 atm, it was visually observed whether or not a crack had been produced on the test specimen. If no crack had been produced, it was evaluated that the plate material was excellent in SSC resistance. The pressure in the autoclave during the test was controlled so as to be always 10 atm.

[Test Results]

Table 2 gives the test results.

TABLE 2

| Classification | Test No. | Steel type | C (mass %) | Normalizing | Cooling method | Ms point passage time (s) | Stop temperature (°C) | Hardness (HRC) | Pre-γ grain size number | 56 C (%) + 26 | Tempering temperature (°C) | Tempering time (min) | Half-value width (°) | Alloying element Concentration in Carbides (%) | Aspect Ratio of Carbides | YS (MPa) | SSC test a bath | SSC test b bath | SSC test c bath |
|---|---|---|---|---|---|---|---|---|---|---|---|---|---|---|---|---|---|---|---|
| Example embodiment of the present invention | 1 | A | 0.59 | — | Continuous | 100 | — | 62.5 | 9.5 | 55.5 | 730 | 30 | 0.25 | 19.5 | 0.62 | 928 | Not cracked | — | Cracked |
| | 2 | A | 0.59 | — | Continuous | 100 | — | 62.5 | 9.5 | 55.5 | 735 | 30 | 0.22 | 19.0 | 0.70 | 885 | Not cracked | — | Not cracked |
| | 3 | A | 0.59 | Performed | Continuous | 100 | — | 61.5 | 11.0 | 55.5 | 730 | 30 | 0.32 | 19.5 | 0.65 | 930 | Not cracked | — | Not cracked |
| | 4 | B | 0.63 | — | Continuous | 300 | — | 64.5 | 9.5 | 57.5 | 710 | 30 | 0.30 | 18.5 | 0.45 | 910 | Not cracked | — | Not cracked |
| | 5 | C | 0.60 | — | Continuous | 300 | — | 62.5 | 9.5 | 56.0 | 710 | 30 | 0.25 | 12.5 | 0.66 | 905 | Not cracked | — | Not cracked |
| | 6 | D | 0.61 | — | Isothermal | — | 160 | 59.3 | 9.6 | 56.5 | 715 | 30 | 0.35 | 19.0 | 0.47 | 904 | Not cracked | — | Not cracked |
| | 7 | D | 0.61 | — | Isothermal | — | 185 | 60.7 | 9.2 | 56.5 | 730 | 30 | 0.33 | 18.8 | 0.55 | 915 | Not cracked | — | Not cracked |
| | 8 | D | 0.61 | — | Isothermal | — | 245 | 59.1 | 9.4 | 56.5 | 715 | 30 | 0.33 | 19.0 | 0.50 | 941 | Not cracked | — | Cracked |
| | 9 | D | 0.61 | — | Isothermal | — | 194 | 62.4 | 9.6 | 56.5 | 730 | 30 | 0.28 | 19.2 | 0.65 | 901 | Not cracked | — | Not cracked |
| | 10 | D | 0.61 | — | Isothermal | — | 282 | 60.3 | 9.8 | 56.5 | 725 | 30 | 0.35 | 19.0 | 0.64 | 874 | Not cracked | — | Not cracked |
| | 11 | E | 0.61 | — | Continuous | 600 | — | 61.1 | 9.6 | 56.5 | 715 | 30 | 0.30 | 18.8 | 0.51 | 908 | Not cracked | — | Not cracked |
| | 12 | E | 0.61 | — | Continuous | 300 | — | 61.7 | 9.3 | 56.5 | 715 | 30 | 0.35 | 18.8 | 0.45 | 885 | Not cracked | — | Not cracked |
| | 13 | E | 0.61 | — | Continuous | 300 | — | 61.0 | 9.5 | 56.5 | 715 | 30 | 0.34 | 19.0 | 0.48 | 873 | Not cracked | — | Not cracked |
| | 14 | E | 0.61 | Performed | Continuous | 300 | — | 62.0 | 13.8 | 56.5 | 715 | 30 | 0.36 | 18.9 | 0.50 | 910 | Not cracked | — | Not cracked |
| | 15 | E | 0.61 | Performed | Continuous | 300 | — | 61.0 | 13.3 | 56.5 | 715 | 30 | 0.32 | 18.5 | 0.47 | 877 | Not cracked | — | Not cracked |
| | 16 | E | 0.61 | Performed | Continuous | 300 | — | 62.7 | 11.2 | 56.5 | 725 | 30 | 0.40 | 19.0 | 0.52 | 900 | Not cracked | — | Not cracked |
| | 17 | E | 0.61 | Performed | Continuous | 300 | — | 60.3 | 11.2 | 56.5 | 715 | 30 | 0.41 | 19.0 | 0.48 | 908 | Not cracked | — | Not cracked |
| | 18 | E | 0.61 | Performed | Continuous | 600 | — | 59.9 | 13.5 | 56.5 | 715 | 30 | 0.38 | 19.1 | 0.51 | 897 | Not cracked | — | Not cracked |
| | 19 | E | 0.61 | Performed | Continuous | 600 | — | 60.7 | 11.7 | 56.5 | 715 | 30 | 0.35 | 18.2 | 0.46 | 905 | Not cracked | — | Not cracked |
| | 20 | F | 0.60 | — | Isothermal | — | 217 | 62.5 | 9.7 | 56.0 | 715 | 30 | 0.30 | 19.0 | 0.48 | 909 | Not cracked | — | Not cracked |
| | 21 | F | 0.60 | — | Isothermal | — | 216 | 62.7 | 9.8 | 56.0 | 725 | 30 | 0.33 | 19.1 | 0.51 | 881 | Not cracked | — | Not cracked |
| | 22 | F | 0.60 | Performed | Continuous | 600 | — | 61.0 | 10.5 | 56.0 | 710 | 30 | 0.33 | 19.2 | 0.45 | 929 | Not cracked | — | Not cracked |
| | 23 | G | 0.62 | — | Continuous | 600 | — | 64.5 | 9.5 | 57.0 | 715 | 30 | 0.28 | 10.5 | 0.59 | 904 | Not cracked | — | Not cracked |
| | 24 | G | 0.62 | — | Continuous | 600 | — | 64.5 | 9.5 | 57.0 | 720 | 30 | 0.30 | 9.6 | 0.70 | 892 | Not cracked | — | Not cracked |
| | 25 | G | 0.62 | Performed | Continuous | 600 | — | 64.5 | 10.7 | 57.0 | 715 | 30 | 0.29 | 12.6 | 0.67 | 928 | Not cracked | — | Not cracked |
| | 26 | G | 0.62 | — | Continuous | 600 | — | 64.5 | 10.7 | 57.0 | 710 | 30 | 0.26 | 12.7 | 0.65 | 902 | Not cracked | — | Not cracked |
| | 27 | G | 0.62 | — | Continuous | 600 | — | 64.5 | 10.7 | 57.0 | 715 | 30 | 0.28 | 11.8 | 0.69 | 914 | Not cracked | — | Not cracked |
| | 28 | G | 0.62 | Performed | Continuous | 600 | — | 64.5 | 10.7 | 57.0 | 720 | 30 | 0.30 | 12.8 | 0.65 | 883 | Not cracked | — | Not cracked |
| | 29 | H | 0.62 | Performed | Isothermal | — | 250 | 57.6 | 9.6 | 57.0 | 720 | 30 | 0.33 | 17.8 | 0.51 | 872 | Not cracked | — | Not cracked |
| | 30 | H | 0.62 | Performed | Isothermal | — | 250 | 57.3 | 10.9 | 57.0 | 715 | 30 | 0.32 | 18.7 | 0.50 | 881 | Not cracked | — | Not cracked |
| | 31 | H | 0.62 | — | Continuous | 600 | — | 64.3 | 9.8 | 57.0 | 715 | 30 | 0.42 | 19.0 | 0.46 | 1016 | — | Not cracked | — |
| | 32 | H | 0.62 | — | Continuous | 600 | — | 64.3 | 11.0 | 57.0 | 725 | 30 | 0.35 | 18.8 | 0.53 | 895 | Not cracked | — | Not cracked |
| | 33 | H | 0.62 | Performed | Continuous | 600 | — | 60.2 | 11.0 | 57.0 | 725 | 30 | 0.42 | 18.5 | 0.47 | 1050 | — | Not cracked | — |
| | 34 | H | 0.62 | Performed | Continuous | 600 | — | 60.2 | 9.6 | 57.0 | 720 | 30 | 0.35 | 19.1 | 0.50 | 915 | Not cracked | — | Not cracked |
| | 35 | I | 0.56 | — | Continuous | 600 | — | 60.5 | 9.8 | 54.0 | 705 | 60 | 0.33 | 19.5 | 0.45 | 895 | Not cracked | — | Not cracked |
| | 36 | J | 0.82 | — | Continuous | 600 | — | 67.5 | 9.7 | 61.0 | 720 | 60 | 0.40 | 17.5 | 0.60 | 1040 | — | Not cracked | — |
| | 37 | K | 0.70 | — | Continuous | 600 | — | 63.0 | 9.8 | 56.0 | 715 | 60 | 0.45 | 8.4 | 0.71 | 905 | Not cracked | — | Not cracked |
| | 38 | L | 0.60 | — | Continuous | 600 | — | 58.5 | 9.3 | 56.5 | 710 | 60 | 0.45 | 14.5 | 0.62 | 905 | Not cracked | — | Not cracked |
| | 39 | M | 0.60 | — | Continuous | 600 | — | 61.0 | 9.3 | 56.5 | 715 | 30 | 0.40 | 19.0 | 0.48 | 915 | Not cracked | — | Not cracked |
| | 40 | N | 0.61 | — | Continuous | 600 | — | 59.5 | 9.2 | 56.5 | 715 | 30 | 0.48 | 12.5 | 0.69 | 908 | Not cracked | — | Not cracked |
| | 41 | O | 0.61 | — | Continuous | 600 | — | 60.5 | 9.4 | 56.5 | 710 | 30 | 0.45 | 18.9 | 0.49 | 910 | Not cracked | — | Not cracked |
| | 42 | AB | 0.61 | — | Continuous | 600 | — | 60.2 | 9.5 | 56.5 | 715 | 30 | 0.41 | 6.3 | 0.71 | 914 | Not cracked | — | Not cracked |
| | 43 | AC | 0.61 | — | Continuous | 600 | — | 60.3 | 9.6 | 56.5 | 715 | 30 | 0.38 | 19.0 | 0.46 | 915 | Not cracked | — | Not cracked |

TABLE 2-continued

| Classification | Test No. | Steel type | C (mass %) | Normalizing | Cooling method | Ms point passage time (s) | Stop temperature (°C) | Hardness (HRC) | Pre-γ grain size number | 56 C (%) + 26 | Tempering temprature (°C) | Tempering time (min) | Half-value width (°) | Alloying element Concentration in Carbides (%) | Aspect Ratio of Carbides | YS (MPa) | SSC test a bath | SSC test b bath | SSC test c bath |
|---|---|---|---|---|---|---|---|---|---|---|---|---|---|---|---|---|---|---|---|
| Comparative example | 44 | D | 0.61 | — | Isothermal | — | 370 | 44.5 | 9.9 | 56.5 | 725 | 30 | 0.62* | 19.2 | 0.47 | 886 | Cracked | — | Cracked |
| | 45 | D | 0.61 | — | Isothermal | — | 382 | 48.5 | 10.0 | 56.5 | 730 | 30 | 0.60* | 19.3 | 0.50 | 812 | Cracked | — | Cracked |
| | 46 | D | 0.61 | — | Isothermal | — | 398 | 50.6 | 10.3 | 56.5 | 730 | 30 | 0.58* | 19.2 | 0.49 | 831 | Cracked | — | Cracked |
| | 47 | D | 0.61 | — | Continuous | 3000 | — | 42.2 | 9.2 | 56.5 | 720 | 30 | 0.68* | 18.9 | 0.47 | 831 | Cracked | — | Cracked |
| | 48 | D | 0.61 | — | Continuous | 1000 | — | 49.4 | 9.2 | 56.0 | 715 | 30 | 0.55* | 19.0 | 0.48 | 844 | Cracked | — | Cracked |
| | 49 | F | 0.60 | — | Isothermal | — | 324 | 49.5 | 9.3 | 56.0 | 715 | 30 | 0.53* | 19.1 | 0.45 | 829 | Cracked | — | Cracked |
| | 50 | F | 0.60 | — | Isothermal | — | 370 | 51.2 | 9.5 | 56.0 | 725 | 30 | 0.52* | 18.5 | 0.51 | 874 | Cracked | — | Cracked |
| | 51 | F | 0.60 | — | Isothermal | — | 470 | 39.9 | 9.2 | 56.0 | 680 | 30 | 0.65* | 19.1 | 0.40 | 847 | Cracked | — | Cracked |
| | 52 | F | 0.60 | Performed | Isothermal | — | 401 | 41.5 | 10.5 | 56.0 | 680 | 30 | 0.63* | 19.0 | 0.37 | 856 | Cracked | — | Cracked |
| | 53 | F | 0.60 | Performed | Isothermal | — | 333 | 50.1 | 10.5 | 56.0 | 710 | 30 | 0.56* | 19.1 | 0.47 | 882 | Cracked | — | Cracked |
| | 54 | F | 0.60 | Performed | Isothermal | — | 386 | 51.9 | 10.5 | 56.0 | 720 | 30 | 0.52* | 18.0 | 0.51 | 844 | Cracked | — | Cracked |
| | 55 | H | 0.62 | — | Isothermal | — | 380 | 51.9 | 9.4 | 57.0 | 715 | 30 | 0.55* | 19.3 | 0.49 | 829 | Cracked | — | Cracked |
| | 56 | H | 0.62 | — | Isothermal | — | 400 | 49.2 | 9.1 | 57.0 | 720 | 30 | 0.56* | 19.0 | 0.50 | 858 | Cracked | — | Cracked |
| | 57 | H | 0.62 | Performed | Isothermal | — | 380 | 52.0 | 10.6 | 57.0 | 715 | 30 | 0.58* | 18.2 | 0.47 | 851 | Cracked | — | Cracked |
| | 58 | H | 0.62 | Performed | Isothermal | — | 400 | 48.7 | 10.9 | 57.0 | 720 | 30 | 0.60* | 18.1 | 0.48 | 901 | Cracked | — | Cracked |
| | 59 | P | 0.38 | — | Continuous | 100 | — | 46.2 | 9.5 | 45.0 | 715 | 30 | — | 23.0 | 0.40 | 906 | Cracked | — | Cracked |
| | 60 | Q | 0.48 | — | Continuous | 100 | — | 53.5 | 9.4 | 50.0 | 735 | 30 | — | 21.8 | 0.43 | 909 | Cracked | — | Cracked |
| | 61 | R | 0.52 | — | Continuous | 100 | — | 60.5 | 9.0 | 52.0 | 715 | 30 | — | 20.5 | 0.41 | 904 | Cracked | — | Cracked |
| | 62 | S | 0.50 | — | Continuous | 100 | — | 56.3 | 9.5 | 51.0 | 715 | 30 | — | 21.5 | 0.41 | 903 | Cracked | — | Cracked |
| | 63 | T | 0.49 | — | Continuous | 100 | — | 47.4 | 9.3 | 50.5 | 700 | 30 | — | 21.0 | 0.38 | 998 | Cracked | — | Cracked |
| | 64 | U | 0.50 | — | Continuous | 100 | — | 60.2 | 9.7 | 51.0 | 705 | 30 | — | 20.8 | 0.40 | 1031 | — | Cracked | Cracked |
| | 65 | U | 0.50 | — | Continuous | 100 | — | 60.2 | 9.1 | 51.0 | 715 | 30 | — | 20.7 | 0.41 | 994 | — | Cracked | Cracked |
| | 66 | V | 0.50 | — | Continuous | 100 | — | 61.5 | 9.1 | 51.0 | 705 | 30 | — | 21.5 | 0.38 | 883 | Cracked | — | Cracked |
| | 67 | V | 0.60 | — | Continuous | 100 | — | 61.0 | 9.2 | 56.0 | 710 | 30 | — | 19.0 | 0.46 | 877 | Cracked | — | Cracked |
| | 68 | W | 0.60 | — | Continuous | 100 | — | 62.5 | 9.2 | 56.0 | 710 | 30 | — | 18.4 | 0.46 | 876 | Cracked | — | Cracked |
| | 69 | X | 0.61 | — | Continuous | 100 | — | 62.0 | 9.0 | 56.5 | 710 | 30 | — | 19.1 | 0.47 | 879 | Cracked | — | Cracked |
| | 70 | Y | 0.60 | — | Continuous | 100 | — | 60.5 | 9.3 | 56.0 | 650 | 30 | — | 12.8 | 0.30 | 859 | Cracked | — | Cracked |
| | 71 | Z | 0.60 | — | Continuous | 100 | — | 58.5 | 9.4 | 56.0 | 710 | 30 | — | 19.0 | 0.47 | 886 | Cracked | — | Cracked |
| | 72 | AA | 0.60 | — | Continuous | 100 | — | 58.5 | 9.4 | 56.0 | 710 | 30 | — | 18.5 | 0.46 | 886 | Cracked | — | Cracked |

The term "Performed" in the "Normalizing" column in Table 2 indicates that the steel of the corresponding test number was subjected to normalizing treatment. The term "Continuous" in the "Cooling method" column indicates that the steel of the corresponding test number was subjected to quenching performed by continuous cooling treatment. The term "Isothermal" indicates that the steel of the corresponding test number was subjected to quenching including isothermal treatment. In the "Ms point passage time" column, the Ms point passage time (s) in the continuous cooling treatment is shown. In the "Stop temperature" column, the initial cooling stop temperature (° C.) in the quenching treatment including isothermal treatment is shown. In the "Hardness (HRC)" column, the Rockwell hardness (HRC) of the corresponding test number is shown. In the "Pre-γ grain size number" column, the pre-austenite grain size number of the corresponding test number is shown. In the "50C (%)+26" column, the right-side value of Formula (1), F1=50C+26, is shown. In the "Tempering temperature" column and the "Tempering time", the tempering temperature (° C.) and the tempering time (min) are shown. In the "Half-value width" column, the half-value width (°) of the corresponding test number is shown. In the "alloying element concentration in carbides", the alloying element concentration in the carbides is shown. In the "aspect ratio of carbides", the aspect ratio of the carbides is shown. In the "YS" column, the yield stress (MPa) of the corresponding test number is shown. In the "SSC test" column, the test results in the a bath to c bath are shown. The term "Not cracked" indicates that a crack was not produced. The term "Cracked" indicates that a crack was produced. The retained austenite percentages of all of the test numbers 1 to 72 were 0%.

Referring to Table 2, the chemical compositions of test numbers 1 to 43 were within the range of chemical composition of the low alloy steel for oil country tubular goods according to the present invention. Also, the yield stresses of test numbers 1 to 43 were 862 MPa or higher, that is, 125 ksi or higher.

Further, in test numbers 1 to 43, in test numbers 1 to 5, 11 to 19, 22 to 28, and 31 to 43 in which the steel was subjected to quenching performed by continuous cooling treatment, the Ms point passage time was within 600 seconds. In test numbers 1 to 43, in test numbers 6 to 10, 20, 21, 29, and 30 in which the steel was subjected to quenching including isothermal treatment, the stop temperature was higher than 100° C. and not higher than 300° C. For this reason, all of test numbers 1 to 43 satisfied Formula (1), and had a half-value width of 0.50° or smaller. Moreover, the alloying element concentration in the carbides of test numbers 1 to 43 is 20.0% or below, and the aspect ratio of the carbides is 0.45 or above. The tempering temperature for each of these test numbers is 700° C. or above.

In test numbers 1 to 43, a crack was not confirmed in the SSC resistance test using the a bath or b bath. Further, for the test specimens having a yield stress of 862 MPa to 925 MPa, regardless of the performance of normalizing treatment, a crack was not confirmed even in the SSC resistance test using the c bath. That is, the plate material having a yield stress of 862 MPa to 925 MPa exhibited an excellent SSC resistance even in the environment containing hydrogen sulfide of 1 atm or higher.

To sphericalize the carbides, it was effective to reduce the alloying element concentration in the carbides as well as increase the tempering temperature after quenching. To sphericalize the carbides, it was found out that a tempering temperature of 700° C. or above is preferable.

In test numbers 3, 14 to 19, 22, 25 to 28, 30, 33, and 34, normalizing treatment was performed. For this reason, the pre-austenite crystal grain number was 10 or more. Therefore, in test numbers 3, 22, and 25 having a yield stress exceeding 925 MPa, a crack was not confirmed in the SSC resistance test using the c bath. On the other hand, in test number 1 having a yield stress exceeding 925 MPa, a crack was confirmed in the SSC resistance test using the c bath because normalizing treatment was not performed.

The chemical compositions of test numbers 44 to 46 and 49 to 58 in which the steel was subjected to quenching including isothermal treatment were within the range of chemical composition of the low alloy steel for oil country tubular goods according to the present invention. However, the initial cooling stop temperature in quenching including isothermal treatment exceeded 300° C. For this reason, the Rockwell hardnesses (HRC) of the as-quenched materials of test numbers 44 to 46 and 49 to 58 did not satisfy Formula (1), and the half-value widths of all of test numbers 44 to 46 and 49 to 58 exceeded 0.50°. Therefore, on the test specimens of test numbers 44 to 46 and 49 to 58, a crack was confirmed in the SSC resistance test using the a bath and c bath.

The chemical compositions of test numbers 47 and 48 in which the steel was subjected to continuous cooling treatment were within the range of chemical composition of the low alloy steel for oil country tubular goods according to the present invention. However, the Ms point passage time exceeded 600 seconds. For this reason, the Rockwell hardnesses (HRC) of test numbers 47 and 48 did not satisfy Formula (1), and the half-value width thereof exceeded 0.50°. Therefore, on the test specimens of test numbers 47 and 48, a crack was confirmed in the SSC resistance test using the a bath and c bath.

The C contents of test numbers 59 to 66 were lower than the lower limit of C content of the low alloy steel for oil country tubular goods according to the present invention.

Therefore, on the test specimens of test numbers 59 to 66, a crack was confirmed in the SSC resistance test using the a bath to c bath or in the SSC resistance test using the b bath.

The Mn content of test number 67 exceeded the upper limit of Mn content of the low alloy steel for oil country tubular goods according to the present invention. The P content of test number 68 exceeded the upper limit of P content of the low alloy steel for oil country tubular goods according to the present invention. The S content of test number 69 exceeded the upper limit of S content of the low alloy steel for oil country tubular goods according to the present invention. The Mo content of test number 70 exceeded the upper limit of Mo content of the low alloy steel for oil country tubular goods according to the present invention. The chemical composition of test number 71 did not contain V. The O content of test number 72 exceeded the upper limit of O content of the low alloy steel for oil country tubular goods according to the present invention. Therefore, on the test specimens of test numbers 67 to 72, a crack was confirmed in the SSC resistance test using the a bath and c bath.

hollow shells underwent thermal treatment including either quenching step by continuous cooling or quenching step including isothermal treatment as shown in Table 4 to produce seamless steel pipes. Test numbers 80-83, having wall thicknesses of 50 mm or more, were subjected to quenching step including isothermal treatment, and not subjected to quenching by continuous cooling. The quenching temperature was in the range of 850 to 920° C. In addition, in case of carrying out of quenching including isothermal treatment, each steel pipe was heated to the quenching temperature; subsequently cooled down by water cooling at a cooling rate of 5° C. or more as initial cooling, thereby cooling down the temperature of the steel pipe to the cooling stop temperature; and subjected to isothermal heat treatment. If needed, intermittent cooling was applied between the water cooling and the isothermal heat treatment in order to stabilize the temperature of the steel pipe around the temperature of isothermal treatment.

TABLE 3

| Classification | Steel type | Chemical composition (unit: mass %, the balance being Fe and impurities) | | | | | | | | | | | | | | |
|---|---|---|---|---|---|---|---|---|---|---|---|---|---|---|---|---|
| | | C | Si | Mn | P | S | Cr | Mo | Nb | Ti | B | sol · Al | N | V | O | Ca | Zr |
| Inventive example | AD | 0.61 | 0.20 | 0.45 | 0.014 | 0.001 | 1.01 | 0.69 | 0.028 | 0.010 | — | 0.032 | 0.0037 | 0.10 | 0.002 | — | — |
| | AE | 0.65 | 0.18 | 0.45 | 0.010 | 0.001 | 1.01 | 0.73 | 0.016 | 0.010 | — | 0.035 | 0.0048 | 0.10 | 0.002 | 0.0019 | — |

EXAMPLE 2

Molten steels AD and AE (190 tons) having the compositions shown in Table 3 were used to produce round billets with a diameter of 310 mm using continuous casting. The round billets were pierced and rolled using a typical Mannesmann-Mandrel method and were cooled in air to produce hollow shells (seamless steel pipes) of an outer diameter of 114.0 to 244.5 mm and a wall thickness of 13.8 to 60.0 mm. The hollow shells were air cooled. After air cooling, the The steel pipes were evaluated in a manner that is basically the same as in Example 1. However, for tension test specimens, arc-like tension specimens were extracted from the steel pipes. The cross section of the arc-like tension test specimens were shaped as an arc, and the longitudinal direction of the arc-like tension test specimens were parallel to the longitudinal direction of the steel pipes.

In the round-bar tensile test specimen for SSC resistance evaluation, the longitudinal direction was parallel to the longitudinal direction of the steel pipes and their size was the same as in Example 1.

The result of the evaluation tests are shown in Table 4.

TABLE 4

| Classification | Test No. | Steel type | C (mass %) | Normalizing | Cooling method | $CR_{8-5}$ (° C./s) | $2837t^{-2.2}$ | Ms point passage time (s) | Stop temperature (° C.) |
|---|---|---|---|---|---|---|---|---|---|
| Inventive Example | 73 | AD | 0.61 | — | Continuous | 60 | 7.34 | 10* | — |
| | 74 | AD | 0.61 | — | Continuous | 4 | 7.34 | 150 | — |
| | 75 | AD | 0.61 | — | Isothermal | — | — | — | 250 |
| | 76 | AD | 0.61 | Performed | Continuous | 4 | 7.34 | 150 | — |
| | 77 | AD | 0.61 | Performed | Isothermal | — | — | — | 250 |
| | 78 | AE | 0.65 | — | Continuous | 4 | 8.76 | 150 | — |
| | 79 | AE | 0.65 | Performed | Continuous | 4 | 8.81 | 150 | — |
| | 80 | AE | 0.65 | — | Isothermal | — | — | — | 250 |
| | 81 | AE | 0.65 | Performed | Isothermal | — | — | — | 250 |
| | 82 | AE | 0.65 | — | Isothermal | — | — | — | 250 |
| | 83 | AE | 0.65 | Performed | Isothermal | — | — | — | 250 |

TABLE 4-continued

| Classification | Hardness (HRC) | Pre-Y grain number | 50 C (%) + 26 | Tempering temperature (° C.) | Tempering time (m) | Half-value width (°) | Alloying element concentration in carbides |
|---|---|---|---|---|---|---|---|
| Inventive Example | 62.0 | 9.6 | 56.5 | 730 | 30 | 0.23 | 19.1 |
| | 61.5 | 9.5 | 56.5 | 730 | 30 | 0.22 | 18.6 |
| | 60.5 | 9.6 | 56.5 | 725 | 30 | 0.25 | 19.2 |
| | 61.5 | 11.5 | 56.5 | 730 | 30 | 0.26 | 19.0 |
| | 61.0 | 11.6 | 56.5 | 725 | 30 | 0.24 | 19.1 |
| | 62.0 | 9.6 | 58.5 | 730 | 30 | 0.25 | 19.0 |
| | 61.5 | 11.3 | 58.5 | 730 | 30 | 0.24 | 18.6 |
| | 61.0 | 9.5 | 58.5 | 715 | 30 | 0.30 | 18.9 |
| | 60.5 | 11.3 | 58.5 | 715 | 30 | 0.28 | 18.5 |
| | 59.8 | 9.7 | 58.5 | 705 | 30 | 0.36 | 19.2 |
| | 59.5 | 11.5 | 58.5 | 705 | 30 | 0.35 | 19.1 |

| Classification | Aspect ratio of carbides | YS (MPa) | SSC test a bath | SSC test b bath | SSC test c bath | Size of steel pipe Outer diameter (mm) | Size of steel pipe Thickness (mm) | Quenching Crack |
|---|---|---|---|---|---|---|---|---|
| Inventive Example | 0.61 | 912 | Not cracked | — | Cracked | 114.0 | 15.0 | Cracked |
| | 0.62 | 901 | Not cracked | — | Cracked | 114.0 | 15.0 | Not cracked |
| | 0.65 | 905 | Not cracked | — | Cracked | 114.0 | 15.0 | Not cracked |
| | 0.62 | 910 | Not cracked | — | Not cracked | 114.0 | 15.0 | Not cracked |
| | 0.61 | 908 | Not cracked | — | Not cracked | 114.0 | 15.0 | Not cracked |
| | 0.65 | 910 | Not cracked | — | Cracked | 244.5 | 13.8 | Not cracked |
| | 0.61 | 912 | Not cracked | — | Not cracked | 244.5 | 13.8 | Not cracked |
| | 0.58 | 905 | Not cracked | — | Cracked | 216.7 | 50.0 | Not cracked |
| | 0.58 | 900 | Not cracked | — | Not cracked | 216.7 | 50.0 | Not cracked |
| | 0.55 | 904 | Not cracked | — | Cracked | 216.7 | 60.0 | Not cracked |
| | 0.54 | 908 | Not cracked | — | Not cracked | 216.7 | 60.0 | Not cracked |

In case of carrying out of the quenching step by continuous cooling, the column "$CR_{8-5}$" in Table 4 contains cooling rates $CR_{8-5}$ (° C./s). The column "$2837t^{-2-2}$" contains values from the right side of Formula (2). "Cracked" in the column "Quenching cracks" indicates that there was a quenching crack after quenching. "Not cracked" indicates that no quenching crack was found after quenching.

For test number 73 in Table 4, the hollow shell was subjected to immersion water cooling and the Ms point passage time is 10 seconds. Therefore, the seamless steel pipe for test number 73 exhibited quenching cracks extended to the both of ends of the hollow shell. For the test number 73, the seamless steel pipe having the quenching cracks was tempered and evaluated.

Test numbers 74 to 83 satisfied the chemical compositions and the manufacturing conditions stipulated in the first manufacturing method or the second manufacturing method of the present invention, and in case of carrying out the first manufacturing method, each of the cooling rates $CR_{8-5}$ satisfied Formula (2). Therefore, the seamless steel pipes after quenching exhibited no quenching crack and good SSC resistance. Particularly, the specimens for test numbers 76, 77, 79, 81 and 83 which were normalized to be grain-refined, exhibited no SSC even in a more serve c bath. The steel pipe for test number 73 also exhibited good SSC resistance although it developed a quenching crack.

In Table 4, test numbers 73 to 83 each exhibited an alloying element concentration in the carbides of 20.0% or less. Advantageously, the C content may be increased and the alloying elements such as Cr and Mo may be reduced, to reduce the alloying element concentration in the carbides. On the other hand, to achieve a high tempering temperature, it is not desirable to reduce Mo, which increases tempering temperature. Therefore, reducing Cr may be advantageous to reduce the alloying element concentration in the carbides.

The steel pipes for test numbers 73 to 83 had an aspect ratio of the carbides of 0.45 or higher, and sphericalization of the carbides was achieved. Advantageously, for sphericalization of carbides, the alloying element concentration in the carbides may be reduced, as described above, and in addition, tempering temperature after quenching may be increased. It was found out that a tempering temperature of 700° C. or higher is preferable to achieve sufficient sphericalization of the carbides.

The above is the description of the embodiment of the present invention. The above-described embodiment is only a typical example for carrying out the present invention. Therefore, the present invention is not limited to the above-described embodiment, and the above-described embodiment can be changed or modified as appropriate without departing from the spirit and scope of the present invention.

The invention claimed is:

1. A method for producing a low alloy steel for oil country tubular goods, comprising the steps of:
    hot working a billet to produce a steel material, the billet having a chemical composition containing, by mass percent, C: 0.56 to 1.00%, Si: 0.05 to 0.50%, Mn: 0.05 to 1.00%, P: at most 0.025%, S: at most 0.010%, Al: 0.005 to 0.100%, Mo: 0.40 to 1.00%, V: 0.07 to 0.30%, O: at most 0.010% and N: at most 0.0300%, the balance being Fe and impurities;
    subjecting the steel material to quenching treatment including isothermal treatment; and
    tempering the steel material having been quenched at a tempering temperature of 650 to 735° C., wherein
    the step of subjecting the steel material to quenching treatment including isothermal treatment comprises:
    an initial cooling step of cooling the steel material from the quenching temperature to a temperature exceeding 100° C. and not higher than 300° C. at a cooling rate of 0.7° C./s or higher;

an isothermal treatment step of holding the steel material having been subjected to the initial cooling step in the temperature range of exceeding 100° C. and not higher than 300° C.; and a final cooling step of cooling the steel material having been subjected to the isothermal treatment step.

2. The method for producing a low alloy steel for oil country tubular goods according to claim 1, further comprising the step of subjecting the steel material to normalizing treatment after the hot working and before the quenching.

3. The method for producing a low alloy steel for oil country tubular goods according to claim 1, wherein the yield stress of the low alloy steel is at least 862 MPa; and the half-value width of a [211] crystal surface of the low alloy steel obtained by X-ray diffraction is at most 0.50 degree.

4. The method for producing a low alloy steel for oil country tubular goods according to claim 3, wherein the aspect ratio of carbide of the low alloy steel is 0.45 or above.

5. The method for producing a low alloy steel for oil country tubular goods according to claim 3, wherein the C content of the chemical composition is 0.61 to 1.00%.

6. The method for producing a low alloy steel for oil country tubular goods according to claim 2, wherein the yield stress of the low alloy steel is at least 862 MPa; and the half-value width of a [211] crystal surface of the low alloy steel obtained by X-ray diffraction is at most 0.50 degree.

7. The method for producing a low alloy steel for oil country tubular goods according to claim 6, wherein the aspect ratio of carbide of the low alloy steel is 0.45 or above.

8. The method for producing a low alloy steel for oil country tubular goods according to claim 6, wherein the C content of the chemical composition is 0.61 to 1.00%.

* * * * *